United States Patent [19]

Miyamoto et al.

[11] Patent Number: 5,481,461
[45] Date of Patent: Jan. 2, 1996

[54] AUTOMOTIVE VEHICLE ENGINE WITH CYLINDER SUSPENDING MECHANISM FOR SWITCHING BETWEEN A PARTIAL-CYLINDER NON-WORKING MODE AND AN ALL-CYLINDER WORKING MODE DEPENDING ON RUNNING CONDITIONS OF THE ENGINE

[75] Inventors: Katsuhiko Miyamoto; Kazumasa Iida; Mitsuru Kishimoto; Kiyotaka Hosono, all of Kyoto, Japan

[73] Assignee: Mitsubishi Jidosha Kogyo Kabushiki Kaisha, Tokyo, Japan

[21] Appl. No.: 104,041

[22] PCT Filed: Dec. 25, 1992

[86] PCT No.: PCT/JP92/01717

§ 371 Date: Aug. 18, 1993

§ 102(e) Date: Aug. 18, 1993

[87] PCT Pub. No.: WO93/13311

PCT Pub. Date: Jul. 8, 1993

[30] Foreign Application Priority Data

Dec. 26, 1991 [JP] Japan ................................ 3-344748
Dec. 27, 1991 [JP] Japan ................................ 3-346709
Dec. 25, 1992 [JP] Japan ................................ 4-346105

[51] Int. Cl.$^6$ ................................................. F02D 17/02
[52] U.S. Cl. .................... 364/431.01; 364/431.03; 364/431.08; 60/276; 123/198 F; 123/481; 123/425; 73/117.3; 73/118.1
[58] Field of Search .................... 364/431.01–431.12; 123/481, 198, 197 F, 406, 414, 612, 425, 422, 423, 424, 416, 417, 613, 435, 339, 340, 585, 478, 480, 684, 198 F, 65 R, 268, 571, 443, 275, 699, 486; 73/117.3, 115, 118; 60/602, 611, 603, 601, 600, 285, 276, 278, 301

[56] References Cited

U.S. PATENT DOCUMENTS 4,176,650 12/1979 Noguchi et al. .................... 123/198 F
4,224,920 9/1980 Sugasawa et al. .................. 123/198 F (List continued on next page.)

FOREIGN PATENT DOCUMENTS 2544390 1/1984 France .
3313038 10/1984 Germany .
59-029771 2/1984 Japan .
59-110858 6/1984 Japan .
3172554 7/1991 Japan .

OTHER PUBLICATIONS

International Search Report for PCT/JP92/01717 of which this application is the U.S. National phase (English Language).

Primary Examiner—Kevin J. Teska
Assistant Examiner—Jacques H. Louis-Jacques
Attorney, Agent, or Firm—Birch, Stewart, Kolasch & Birch

[57] ABSTRACT

The present invention relates to an automotive vehicle engine having controls for switching between a whole cylinder working mode and a partial cylinder non-working mode by making a valve motion arrangement operated in the intake and exhaust process. The automotive vehicle engine comprises-a revolution sensor, a boost pressure sensor, an ignition driving apparatus and a controlling apparatus for controlling the cylinder suspending mechanism and the ignition driving apparatus. The partial cylinder non-working mode or the all cylinder working mode is determined on the basis of the revolution speed "Ne" and the boost pressure data "Pb". An ignition timing retard process and an idle speed shifting-up process are performed so as to control the torque variation of the engine caused at the time when the all cylinder working mode is switched to the partial cylinder non-working mode or when the partial cylinder non-working mode is switched to the all cylinder working mode, thereby preventing torque shock from occurring and thereby preventing the engine from stopping and enhancing drivability.

8 Claims, 20 Drawing Sheets

U.S. PATENT DOCUMENTS

| | | | |
|---|---|---|---|
| 4,245,471 | 1/1981 | Sugasawa et al. | 60/276 |
| 4,256,074 | 3/1981 | Sugasawa et al. | 60/285 |
| 4,274,373 | 6/1981 | Sugasawa et al. | 60/276 |
| 4,467,602 | 8/1984 | Iizuka | 60/276 |
| 4,494,502 | 1/1985 | Endo et al. | 132/198 F |
| 4,494,503 | 1/1985 | Danno et al. | 123/198 F |
| 4,520,272 | 5/1985 | Danno et al. | 123/339 |
| 4,550,704 | 10/1985 | Barho et al. | 123/481 |
| 4,711,213 | 12/1987 | Sakakibara et al. | 123/425 |
| 4,712,527 | 12/1987 | Staerzl | 123/418 |
| 4,715,184 | 12/1987 | Oosawa et al. | 60/602 |
| 4,788,822 | 12/1988 | Mieno et al. | 123/425 |
| 4,848,086 | 7/1989 | Inoue et al. | 123/564 |
| 4,882,695 | 11/1989 | Mieno et al. | 364/431.08 |
| 4,951,627 | 8/1990 | Watanabe et al. | 123/339 |
| 4,976,241 | 12/1990 | Ishida et al. | 123/425 |
| 5,047,943 | 9/1991 | Takahata et al. | 364/431.03 |
| 5,186,081 | 2/1993 | Richardson et al. | 364/431.01 |
| 5,226,393 | 7/1993 | Nagano et al. | 123/478 |
| 5,337,719 | 8/1994 | Togai | 123/478 |

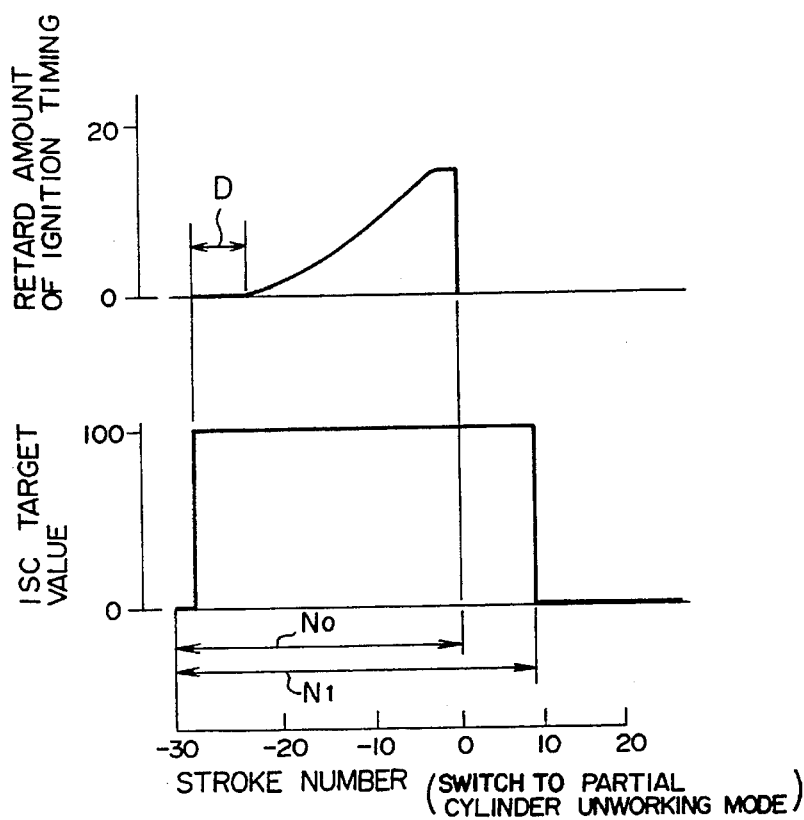

AUTOMOTIVE VEHICLE ENGINE WITH CYLINDER SUSPENDING MECHANISM FOR SWITCHING BETWEEN A PARTIAL-CYLINDER NON-WORKING MODE AND AN ALL-CYLINDER WORKING MODE DEPENDING ON RUNNING CONDITIONS OF THE ENGINE

FIELD OF THE INVENTION

The present invention relates to an automotive vehicle engine, and more particularly to an automotive vehicle engine provided with a cylinder suspending mechanism for suspending the working of the partial cylinders selected from the whole cylinders of the engine by means of a valve motion arrangement for the intake and exhaust of the fuel/air mixture.

BACKGROUND OF THE INVENTION

In general, an automotive vehicle engine is constructed and operated in such a manner that the maximum opening amount of the valve corresponds the maximum lift amount of the cam profile of the valve opening and closing cam and is maintained constant. Under such condition, it is difficult at the present stage to ensure optimum intake and exhaust efficiencies in the respective running modes determined depending upon revolution speed of the engine and load data including the opening degrees of the throttle valves.

More specifically, the cam profile is determined in view of the fact that the fuel/air mixture intake and exhaust efficiencies should be boosted within the range of high speed condition of the engine in order to produce an engine required to have a high output, while the fuel consumption ratio tends to be sacrificed within the range of the low speed condition of the engine.

On the other hand, the cam profile is designed to have a high fuel consumption ratio which, however, sometimes does not ensure sufficient outputs of the engine during the high speed and high load conditions.

For this reason, there have been proposed a wide variety of automotive vehicle engines each having a cylinder suspending mechanism which suspends the working of partial cylinders selected from the whole cylinders of the engine so that the fuel consumption ratios of the engine under the low revolution speed and low load conditions can be reduced and the outputs of the engine can be increased under the high revolution speed and high load conditions. This kind of engine comprises a plurality of valve opening and closing cams each having high and low speed cam profiles, a plurality of rocker arms each having a cam follower held in opposing and engaging relationship to each of the cams, and a plurality of rocker shafts fixedly supporting the rocker arms, respectively, and each having a sub-rocker arm held in engaging relationship with the valve stem of the valve. The rocker arms and rocker shafts are so constructed as to be selectively engaged with and disengaged from each other by means of plungers each slidably received in the rocker arm and the rocker shaft to be hydraulically controlled.

In the foregoing cylinder suspending mechanism, the engaging rocker arms are rocked to operate the sub-rocker arms, respectively, by way of the respective rocker shafts for opening and closing the valves. One example of such an apparatus is disclosed, for example, in the specification and drawings of Japanese Patent Application No. 2-182131 filed by the present applicant.

The known apparatus is so constructed that the opening and closing amounts of the valve can be changed by the valve opening and closing cam during low and high speed operations while the rocker :arm can be engaged with and disengaged from the rocker shaft by the plunger to enable the cylinder to be held under worked and unworked conditions.

For example, the unworked cylinders such as Nos. 1 and 4 cylinders are determined for a four-cylinder engine in advance of the unworked cylinder operation of engine. The unworked cylinder operation is determined on the basis of a running mode map selected depending upon the revolution speed and load data of the engine.

The above engine having such a cylinder suspending system encounters such a difficulty that when the all cylinder working mode having the valves opened and closed in all cylinders such as for example four cylinders held under worked conditions changed to the partial cylinder unworking mode having the valves opened and closed in the only two cylinders held under unworked conditions, the vacuumization tendency in the intake system under the all cylinder working mode is larger than that under the partial cylinder working mode for the same opening degree of the throttle valve due to the increased amount of air to be introduced into the engine. This results in the fact that when the all cylinder working mode is switched to the partial cylinder unworking mode, sufficient time is required until the boost pressure reaches a certain vacuum pressure commensurate with that of the partial cylinder working mode, thereby causing a time lag and thus failing to supply an adequate amount of air to the engine.

Consequently, the output of the engine is apt to be decreased as a result of the insufficient amount of air to be supplied to the engine until the boost pressure is enhanced to the predetermined level.

On the other hand, it has been found, from the point of view for the variation characteristics of the boost pressure and the output torque of the engine at the transition time period of the running condition from the all cylinder working mode (four-cylinder working condition) to the partial cylinder unworking mode (two-cylinder working condition) in the automotive vehicle engine having such an cylinder suspending system, that the output torque of the engine is remarkably decreased (as shown by a single dot and dash line in FIG. 18) in addition to the time lag taken for rising to a predetermined boost pressure when the all cylinder working mode is changed to the partial cylinder working mode under the influence of the hydraulically driven valve mechanism.

Therefore, there has been an undesirable possibility that the torque shock takes place as a result of the abrupt decrease of the output torque of the engine at the transition time period of the running condition from the all cylinder working mode to the partial cylinder unworking mode.

On the other hand, when the partial cylinder unworking mode having the valves opened and closed in the only two cylinders held under unworked conditions is changed to the all cylinder working mode having the all valves opened and closed in the all cylinders held under worked conditions, the vacuumization tendency in the intake system under the partial cylinder unworking mode is smaller than that under the all cylinder working mode for the same opening degree of the throttle valve due to the increased amount of air to be introduced into the engine. In reality, the air volume capacity in the intake system causes a time lag until the inner pressure of the intake manifold is lowered to a predetermined vacuum level at the transition time period of the running mode.

Therefore, adequate amount of air necessary for the combustion stroke of the cylinder could be introduced into the cylinder if the partial cylinder unworking mode is switched to the all cylinder working mode to cause the inner pressure of the intake manifold to be abruptly varied, however, a large amount of air is to instantly be introduced into the engine to the degree of the time lag caused in response to the air volume capacity in the intake system by the reason described above. For this reason, the output of the engine is abnormally increased, thereby resulting in the torque shock of the engine at the transition time period of the running mode from the partial cylinder unworking condition to the all cylinder working condition.

It is therefore an object of the present invention to provide an automotive vehicle engine which is so constructed as to prevent the torque shock of the engine caused by the abnormal variation of the inner pressure of the intake manifold at the transition time period of the running mode from the partial cylinder unworking condition to the all cylinder working condition.

It is another object of the present invention to provide an automotive vehicle engine which is so constructed as to prevent the torque shock of the engine caused by the abnormal variation of the inner pressure of the intake manifold at the transition time period of the running from the all cylinder working condition to the partial cylinder unworking condition.

SUMMARY OF THE INVENTION

In accordance with the present invention, there is provided a first automotive vehicle engine provided with a cylinder suspending mechanism for suspending the working of a partial number of the cylinders in response to the running conditions of the engine, comprising a revolution sensor for detecting the revolution speed of the engine, a boost pressure sensor for producing data of the boost pressure of the engine, an ignition driving apparatus for causing the engine to run in such a manner that electric sparks are produced in the engine at respective target ignition timings, and a controlling apparatus for controlling the cylinder suspending mechanism and the ignition driving apparatus, wherein the controlling apparatus has a running mode map for determining an all cylinder working mode and a partial cylinder unworking mode on the basis of the revolution speed and the data of the boost pressure of the engine and an ignition retard map for determining the retard amount used during a calculation of the target ignition timings in such a manner that the retard amount decreases with the lapse of time, the controlling apparatus controlling the ignition driving apparatus in such a manner that the electric sparks are produced in the engine at the respective target ignition timings calculated on the basis of the retard amount decreased with the lapse of time and a standard ignition timing when a stroke number counted after determination of the switching operation from the partial cylinder unworking mode to the all cylinder working mode is within a predetermined range.

In accordance with the present invention, there is a second automotive vehicle engine provided with a cylinder suspending mechanism for suspending the working of a partial number of the cylinders in response to the running conditions of the engine, comprising a revolution sensor for detecting the revolution speed of the engine, a boost pressure sensor for producing data of the boost pressure of the engine, an ignition driving apparatus for causing the engine to run in such a manner that electric sparks are produced in the engine at respective target ignition timings, an idle speed controlling apparatus for controlling the idle revolution speed of the engine in such a manner that the idle revolution speeds converge to a target idle speed value, and a controlling apparatus for controlling the cylinder suspending mechanism, the idle speed controlling apparatus and the ignition driving apparatus, wherein the controlling apparatus has a running mode map for determining an all cylinder working mode and a partial cylinder unworking mode on the basis of the revolution speed and the data of the boost pressure of the engine, and a torque correction map for shifting the target idle speed value from a low idle speed value to a high idle speed value and for determining the retard amount used during a calculation of the target ignition timings in such a manner that the retard amount increases with the lapse of time, the controlling apparatus controlling the idle speed controlling apparatus in such a manner that the idle revolution speeds converge to the target idle speed value shifted to the high idle speed value, and control ling the ignition driving apparatus in such a manner that the electric sparks are produced in the engine at the respective target ignition timings calculated on the basis of the retard amount increased with the lapse of time and a standard ignition timing when the stroke number counted after determination of the switching operation from the all cylinder working mode to the partial cylinder unworking mode is within a predetermined range.

In accordance with the present invention, there is provided a third automotive vehicle engine provided with a cylinder suspending mechanism for suspending the working of a partial number of the cylinders in response to the running conditions of the engine, comprising a revolution sensor for detecting the revolution speed of the engine, a boost pressure sensor for producing data of the boost pressure of the engine, an ignition driving apparatus for causing the engine to run in such a manner that electric sparks are produced in the engine at respective target ignition timings, an idle speed controlling apparatus for controlling the idle revolution speed of the engine in such a manner that the idle revolution speeds converge to a target idle speed value, and a controlling apparatus for control ling the cylinder suspending mechanism, the idle speed controlling apparatus and the ignition driving apparatus, wherein the controlling apparatus has a running mode map for determining an all cylinder working mode and a partial cylinder unworking mode on the basis of the revolution speed and the data of the boost pressure of the engine, a torque correction map for shifting the target idle speed value from a low idle speed value to a high idle speed value and for determining the retard amount used during a calculation of the target ignition timings in such a manner that the amount increases with the lapse of time, and an ignition retard map for determining the retard amount used during a calculation of the target ignition timings in such a manner that the retard amount decreases with the lapse of time, the controlling apparatus controlling the ignition driving apparatus in such a manner that the electric sparks are produced in the engine at the respective target ignition timings calculated on the basis of the retard amount decreased with the lapse of time and the standard ignition timings when a stroke number counted after determination of the switching operation from the partial cylinder unworking mode to the all cylinder working mode is within a predetermine range, and the controlling apparatus controlling the idle speed controlling apparatus in such a manner that the idle revolution speeds converge to the target idle speed value shifted to the high idle speed value and controlling the ignition driving apparatus in such a manner that the electric sparks are produced in the engine at the target ignition timings calculated on the basis of the retard amount increased with the lapse of time and the standard ignition timing when a stroke number counted after determination of the switching operation from the all cylinder working mode to the partial cylinder unworking mode is within a predetermined range.

In each of the first and third the automotive vehicle engines according to the present invention, the controlling apparatus further may have a retard correction map for determining the retard correction amount on the basis of the data of the boost pressure, the retard correction amount being used for correction of the retard amount when the engine is held in predetermined retard correction conditions, and the controlling apparatus controlling the ignition driving apparatus in such a manner that the electric sparks are produced in the engine at the respective target ignition timings calculated on the basis of the retard amount, the retard correction amount and the standard ignition timings when the stroke number counted after the determination of the switching operation from the partial cylinder unworking mode to the all cylinder working mode is within the predetermine range.

In each of the first and third automotive vehicle engines according to the present invention, the predetermined retard corrections conditions may correspond to an idle running condition and an acceleration condition, the controlling apparatus correcting the retard amount in such a manner that the retard amount decreases when the engine is held in the predetermined retard correction conditions.

In each of the second and third automotive vehicle engine according to the present invention, the controlling apparatus may control the ignition driving apparatus under the condition that the retard amount starts to increase with a predetermined delay time after the target idle speed value is shifted to the high idle speed value by the idle speed controlling apparatus.

In accordance with the present invention, the partial cylinder unworking mode or the all cylinder working mode is selected on the basis of the revolution speed and the boost pressure of the engine. If the partial cylinder unworking mode is switched to the all cylinder working mode, the ignition timing is appropriately retarded, thereby making it possible to prevent a torque shock taking place as a result of the abrupt increase of the output of the engine at the transition time period of the running mode from the partial cylinder unworking condition to the all cylinder unworking condition and to decrease a fuel consumption ratio so as to enhance drivability.

If, in addition, the all cylinder working mode is switched to the partial cylinder unworking mode, not only the ignition timing is appropriately retarded but also the revolution speed of the engine is shifted to the high revolution speed value, thereby causing the idle speed controlling apparatus to make it possible to increase intake air amount and causing the retard process to make it possible to control increase of the output torque caused in conjunction with the increase of the intake air amount. Therefore, it is possible to prevent a torque shock taking place as a result of the abrupt decrease of the output of the engine at the transition time period of the running mode from the all cylinder working condition to the partial cylinder unworking condition, to prevent the engine from stopping and to improve drivability.

Particularly, in the case of that the retard amount is corrected in use of the retard correction amount at the time when the engine is in predetermined retard correction conditions, decrease of the output torque undesired by a driver at the conditions is prevented, thereby making it possible to improve the drivability. If, additionally, the retard amount is correctively decreased in the predetermined retard correction conditions corresponding to an idle running condition and an acceleration condition, thereby making it possible to make stable the idle running condition and prevent acceleration ability from lowering. In the case of that the ignition driving apparatus is controlled on condition that the retard amount starts increasing with a delay of predetermined time after the target idle speed value is shifted to the high idle speed value by the idle speed controlling apparatus, it is possible to retard the ignition timing in response to increase of the intake air amount.

BRIEF DESCRIPTION OF THE DRAWINGS

FIGS. 17 (A) and 17(B) are diagrams representing a torque correction map used by the ECU of the automotive vehicle engine shown in FIG. 1.

THE MOST PREFERABLE EMBODIMENTS FOR EMBODYING THE PRESENT INVENTION

Figure 1:
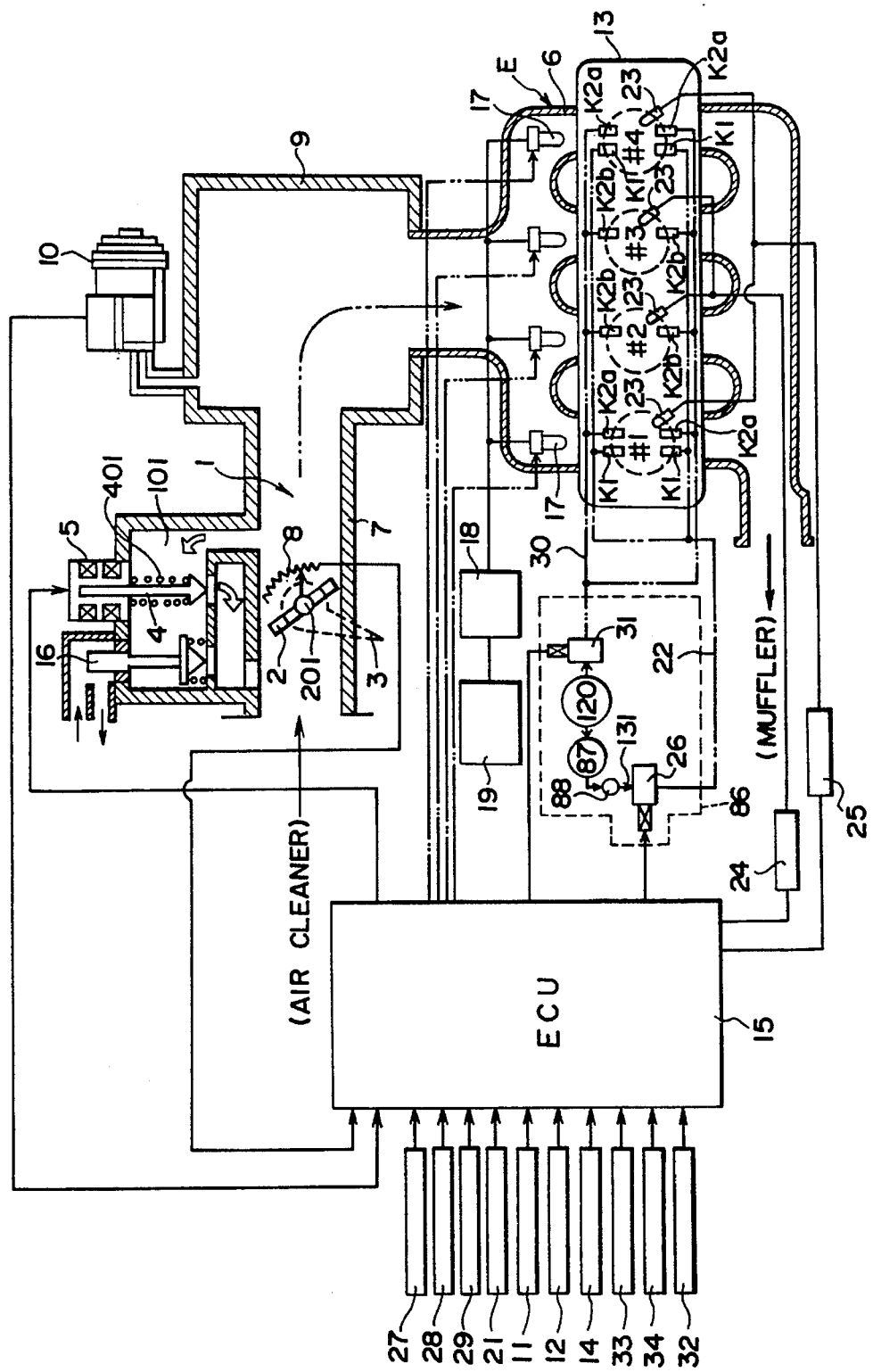
FIG. 1 is a general constitutional view of an automotive vehicle engine of an embodiment according to the present invention.
Figure 2:
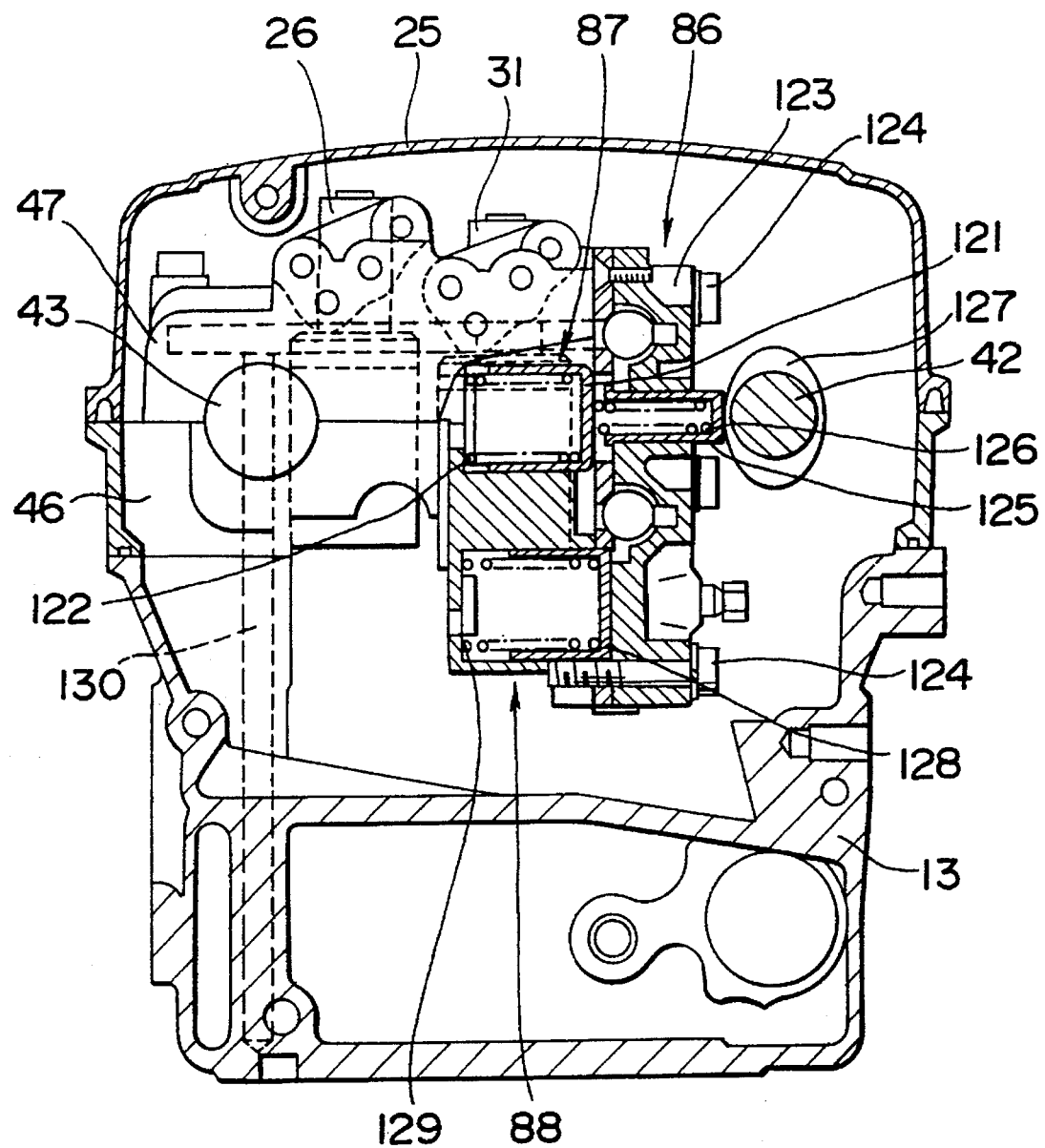
FIG. 2 is a cross-sectional view (taken along a line II—II in FIG. 3) illustrating an essential part of a cylinder head for explaining a valve motion arrangement provided in the internal combustion engine of the embodiment according to the present invention.

A first embodiment of an automotive vehicle engine according to the present invention will be explained with reference to FIGS. 1 to 12 hereinbelow. The automotive vehicle engine illustrated in FIG. 1 is a four-cylinder in-line engine (simply referred to as "engine E" hereinafter) having a mechanism for switching running modes that include a mode for partially suspending the working of partial cylinders.

The engine E is provided with an intake passageway 1 which is constituted by an intake manifold 6, a surge tank 9 connected to the intake manifold 6, an intake pipe 7 integrally formed with the surge tank 9, and an air cleaner not shown. The intake pipe 7 is adapted to rotatably receive therein a throttle valve 2 having a shaft 201 securely connected to a throttle lever 3 at the outer side of the intake manifold 1.

The throttle lever 3 is connected to and rotated by an accelerator pedal (not shown) in such a manner that the throttle valve 2 rotated in a counterclockwise direction as shown in FIG. 1 by the accelerator pedal. The throttle valve 2 is forced to closed by a return spring (not shown) when tension generated in an accelerator cable is weakened. The throttle valve 2 is assembled with a throttle opening sensor 8 for producing an output signal of the opening data of the throttle valve 2, and an idle switch 27 to be held switched on when the throttle valve 2 is entirely closed.

On the other hand, an intake bypass passageway 101 bypasses the throttle valve 2 and is provided with an idle revolution control (ISC) valve 4 for controlling idle revolution speed of the engine. The idle revolution control valve 2 is forced to be closed by a return spring 401 and driven by a stepping motor 5 functioning as an actuator. A first idle air valve 16 is designed to automatically perform a warming up compensation in response to temperature of a coolant at an idling stage. The idle revolution control (ISC) valve 4 is equipped with an ISC position sensor 28 generating the opening position data thereof.

Additionally an intake air temperature sensor 14 is provided in the intake passageway 1 and produces an output signal of the data representing intake air temperature "Ta". A cylinder block not shown is assembled with a water temperature sensor 11 detecting the temperature of the coolant corresponding to warm-up temperature of the engine and a knock sensor 21 producing knocking data of the engine. An ignition coil not shown is equipped with a revolution sensor 12 detecting the engine revolution in the form of ignition pulses. An electric circuit not shown comprises a battery sensor 34 for detecting a battery voltage "VB". The surge tank 7 is provided with a boost pressure sensor 10 producing data of intake manifold pressure (boost pressure) "PB". An air conditioning switch 29 is provided in the passenger room for detecting an air conditioning system held switched on and off. An power-assisted steering switch 32 is provided in the vicinity of a power-assisted steering pump not shown for detecting a operation state of a power-assisted steering system. The engine E comprises a crankshaft not shown provided with a crank angle sensor 33 which produces crank angle data of the crankshaft.

A cylinder head 13 forming in part the engine E is provided with intake and exhaust passageways capable of being in communication with each of cylinders formed in the engine and opened and closed respectively by intake and exhaust valves not shown. The cylinder head 13 is equipped with a valve motion system which is illustrated in FIG. 1 and will be simply described herein but more specifically described hereinlater. The valve motion system is designed to be operable under a low speed mode and a high speed mode, while being operable under an unworked cylinder mode by having the intake and exhaust valves of a first cylinder #1 and a forth cylinder #4 held in their unworked conditions, respectively, with a second cylinder #2 and a third cylinder #3 being held in their worked conditions, respectively. That is, the valve motion system comprises rocker arms assembled with a low speed mode switching mechanism K1 and a high speed mode switching mechanisms K2a and K2b, each of which is so constructed as to switch the engagement and disengagement conditions between a rocker arm and the rocker arm shaft by way of a slide pin, thereby making it possible to selectively switch the engagement and disengagement conditions between low and high speed cams and rocker arms.

The low speed mode switching mechanism K1 forming in part a valve mot condition switching mechanism is fed with pressure oil by a pressure oil circuit 22 through a first electromagnet valve 26, while the high speed mode switching mechanisms K2a and K2b also forming in part the valve motion condition switching mechanisms are fed with pressure oil by pressure oil circuit 30 through a second electromagnet valve 31. It will be understood that both of the first electromagnet valve 26 and the second electromagnet valve 31 respectively having three-way constructions are not energized under the low speed mode by the low speed cam, while both of the first electromagnet valve 26 and the second electromagnet valve 31 are energized under the high speed mode by the high speed cam. The first electromagnet valve 26 is energized, while the second electromagnet valve 31 is not energized under the unworked cylinder mode. The above electromagnet valves 26 and 31 are controlled by an engine control unit (ECU) 15 which will be described hereinafter.

The cylinder head 13 is shown in FIG. 1 as provided with injectors 17 for injecting fuel to the cylinders, respectively, in such a manner that the injectors 17 are supplied from an fuel supply 19 with fuel adjusted under a predetermined pressure level by a fuel pressure adjusting means 18. The injection control is carried out by the engine control unit 15 mentioned above.

The cylinder head 13 is assembled with an ignition driving apparatus which comprises the ignition plugs 23 provided in cylinders, respectively, an igniter 24 electrically connected to the ignition plugs 23 of the cylinders #2 and #3 always worked, an igniter 25 electrically connected to the ignition plugs of the cylinders #1 and #4 selectively worked and unworked, and the ECU 15 for instructing the igniters 24 and 25 to spark the ignition plugs 23.

Next, the structure of the valve motion system according to the present invention will be more specifically described with reference to FIGS. 2 to 12.

As shown in FIGS. 4 to 6 and FIG. 12, an intake camshaft 42 and an exhaust camshaft 43 are provided in the cylinder head 13 in parallel relationship to each other along the longitudinal direction of the cylinder head 13. The intake camshaft 42 and the exhaust camshaft 43 are integrally formed respectively with low speed cams 42 and high speed cams 43. Each of the low speed cams 42 has a small lift amount and is allocated to each of the cylinders, while each of the high speed cams 43 has a large lift amount and is allocated to each of the cylinders. The pair of camshafts 42 and 43 are rotatably supported by the cylinder head 13 in such a manner as to be sandwiched between an upper portion of a camshaft housing 46 and a plurality of cam caps 47 fixedly connected to the camshaft housing 46 by bolts 48 and 49.

In addition, a plurality of intake rocker shaft portions 51 and a plurality of exhaust rocker shaft portions 52 are provided in the cylinder head 13 and will be more specifically described hereinlater. Each of the intake rocker shaft portions 51 and each of the exhaust rocker shaft portions 52 are parallel to each other along the longitudinal direction of the cylinder head 13 in parallel relationship with the pair of camshafts 42 and 43 and are allocated to each of the cylinders. The rocker shaft portions 51 and 52 are rotatably supported by the cylinder head 13 in such a manner as to be sandwiched between the lower portion of the camshaft housing 46 and a plurality of rocker shaft caps 53 fixedly connected to the camshaft housing 46 by the bolts 49 and 54. A cylinder head cover 55 are secured to the upper portion of the cylinder head 13.

Figure 12:
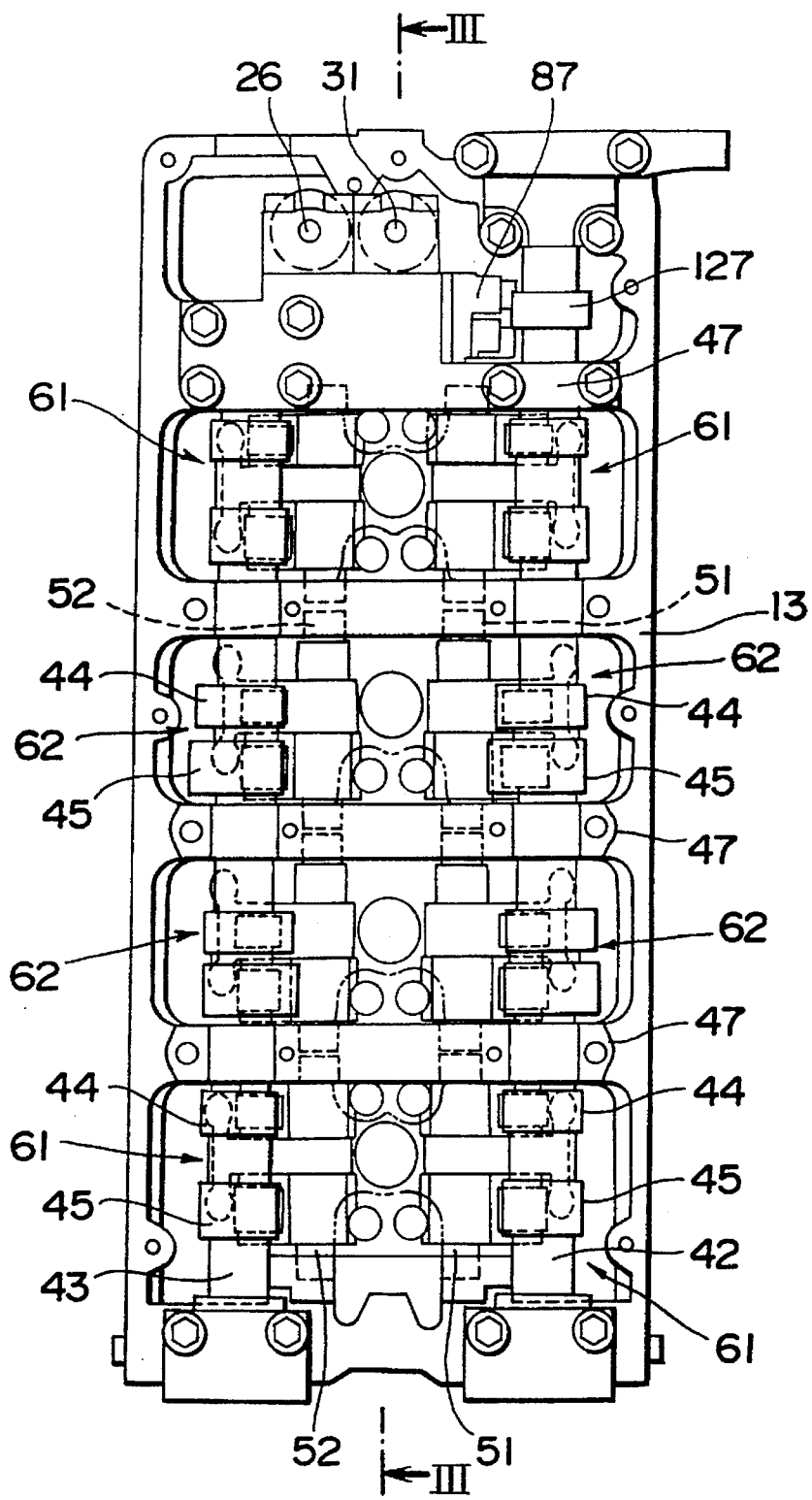
FIG. 12 is a plan view of the cylinder head.

The pairs of rocker shaft portions 51 and 52 are assembled with a valve motion arrangement for carrying out a switching operation at between valve opening and closing timing in high speed running condition and valve opening and closing timing in a low speed running condition, and another valve motion arrangement for carrying out a switching operation at between valve opening and closing timing in high speed running condition and valve opening and closing timing in a low speed running condition and for making it possible to suspend the working of valves under a low load running condition. As shown in FIG. 12, each of valve motion arrangements 61 corresponding to uppermost and lowermost cylinders of the four cylinders is provided with a cylinder suspending mechanism, while each of the valve motion arrangements 62 corresponding to the rest of the four cylinders is not provided with any cylinder suspending mechanism.

The valve motion arrangement 61 with the cylinder suspending mechanisms will be described hereinlater. Initially, the exhaust rocker shaft portions 52 will be described in detail with reference to FIG. 7. Bach of the exhaust arm portions 52a comprises a T-shaped lever 63 extending from the center of the rocker shaft portion 52 in a direction at a right angle thereto in such a manner that the T-shaped lever 63 is integrally formed with the rocker shaft portion 52. Bach of the intake rocker shaft portions 51 is similarly assembled with a T-shaped lever 63 in such a manner that an intake rocker shaft is integrally formed with the T-shaped lever 63 forming an exhaust arm portion. Bach of the exhaust rocker shaft portions 52 is also provided with a low speed rocker arm 64 and a high speed rocker arm 65 forming subrocker arms in addition to T-shaped lever seen generally as a letter "T" in a plan view in such a manner that the T-shaped lever 63 is positioned between the low speed rocker arm 64 and the high speed rocker arm 65. The exhaust arm portion 52a has one end portion integrally formed with the rocker shaft portion 52 and the other end portion provided with adjust screws 66. The adjust screws 66 are attached to the other end portion of the T-shaped lever 63 by means of the adjust nuts 67 and have lower end portions which are held in contact with upper end portions of a pair of exhaust valves 80 described hereinafter.

On the other hand, the low speed rocker arm 64 has one end portion rotatably supported by the rocker shaft portion 52 and the other end portion assembled with a roller bearing 68 designed to engage with the low speed cam 44. The high speed rocker arm 65 similarly has one end portion rotatably supported by the rocker shaft portion 52 and the other end portion assembled with a roller bearing 69 designed to engage with the high speed cam 45.

Figure 6:
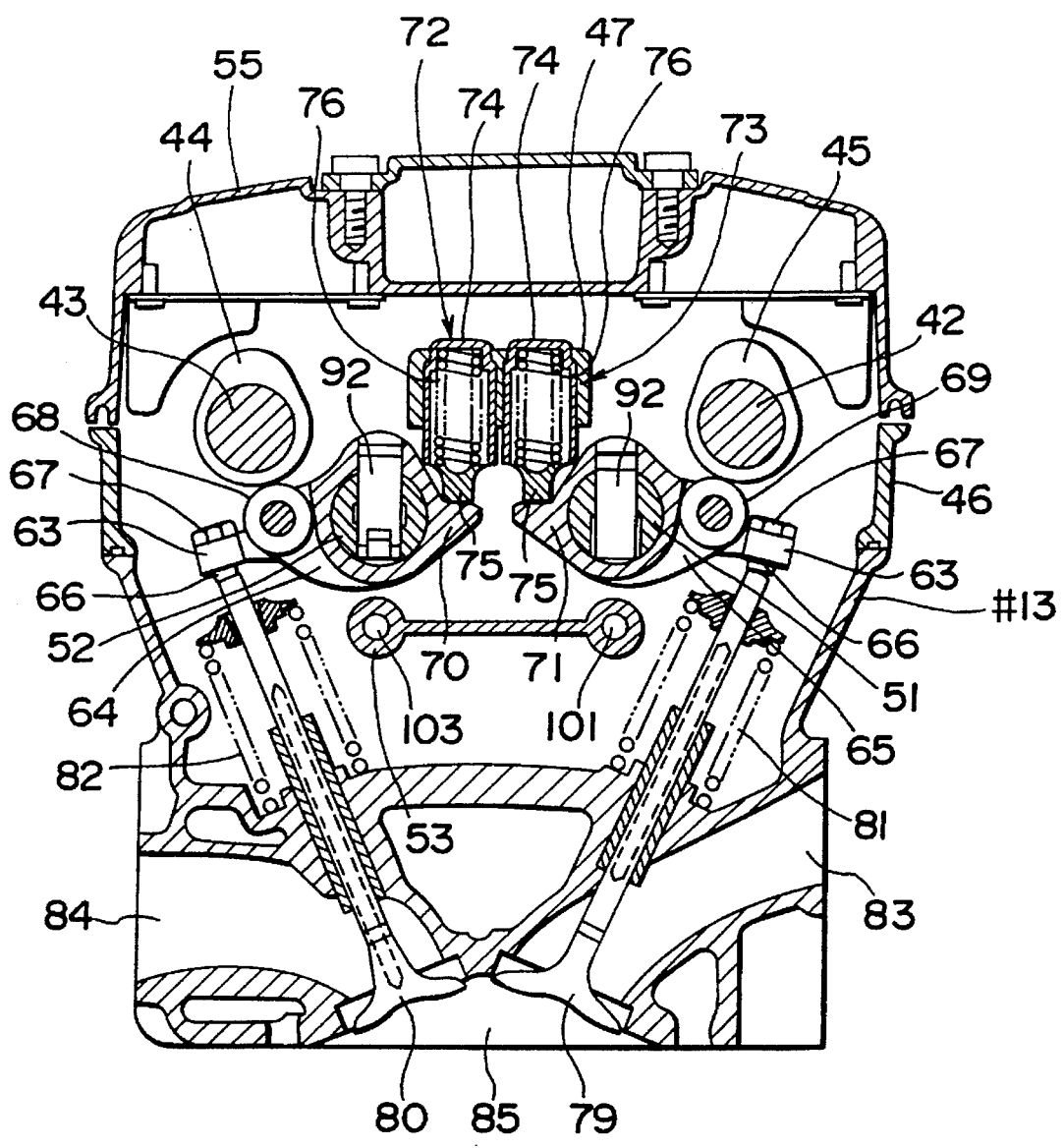
FIG. 6 is a cross-sectional view taken a long a line VI—VI in FIG. 4.
Figure 7:
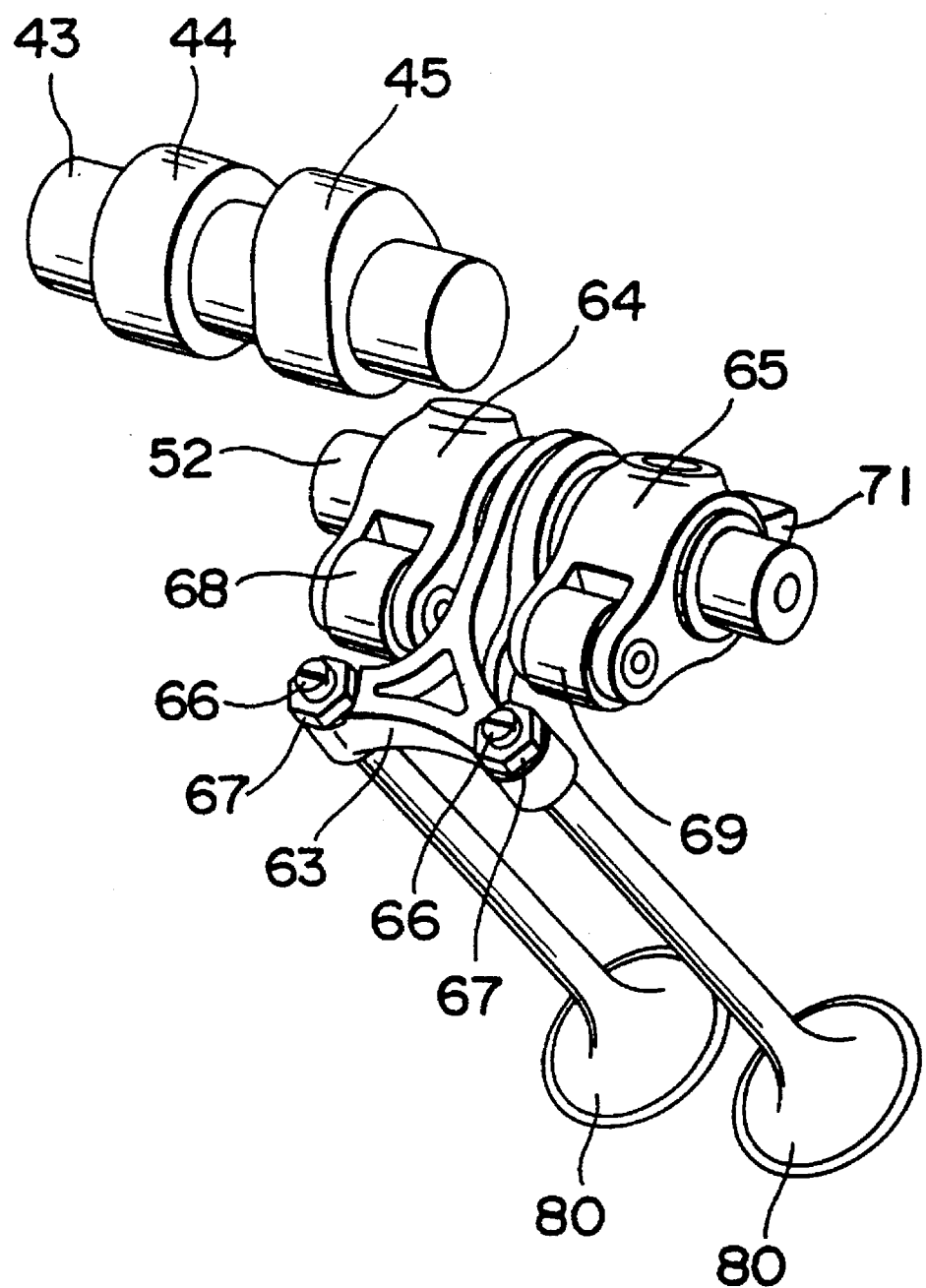
FIG. 7 is a perspective view showing the valve motion arrangement partially dismantled.

As shown in FIG. 6, the low speed rocker arm 64 and the high speed rocker arm 65 are integrally formed with arm portions 70 and 71, respectively in such a manner that the arm portions 70 and 71 are positioned in symmetrical relationship with the roller bearings 68 and 69, respectively, with respect to the rocker shaft portion 52. The arm portions 70 and 71 are operated respectively by arm spring units 72 and 73 each comprising a cylinder 74 secured to the cam cap 47, a plunger 75 and a compression spring 76. The plungers 75 press the arm portions 70 and 71, respectively, and force the left side rocker arms 64 and 65, respectively, to rotate in the clockwise direction and the right side rocker arms 64 and 65, respectively, to rotate in the counterclockwise direction in FIG. 6.

Normally, the low speed rocker arm 64 and the high speed rocker arm 65 are respectively held in contact with the peripheral surfaces of the low speed cam 44 and the high speed cam 45 through the roller bearings 68 and 69 under the influence of the arm springs 72 and 73, respectively. If the camshafts 42 and 43 are rotated, the cams 44 and 45 can cause respectively the low speed rocker arm 64 and the high speed rocker arm 65 to swing.

Figure 8:
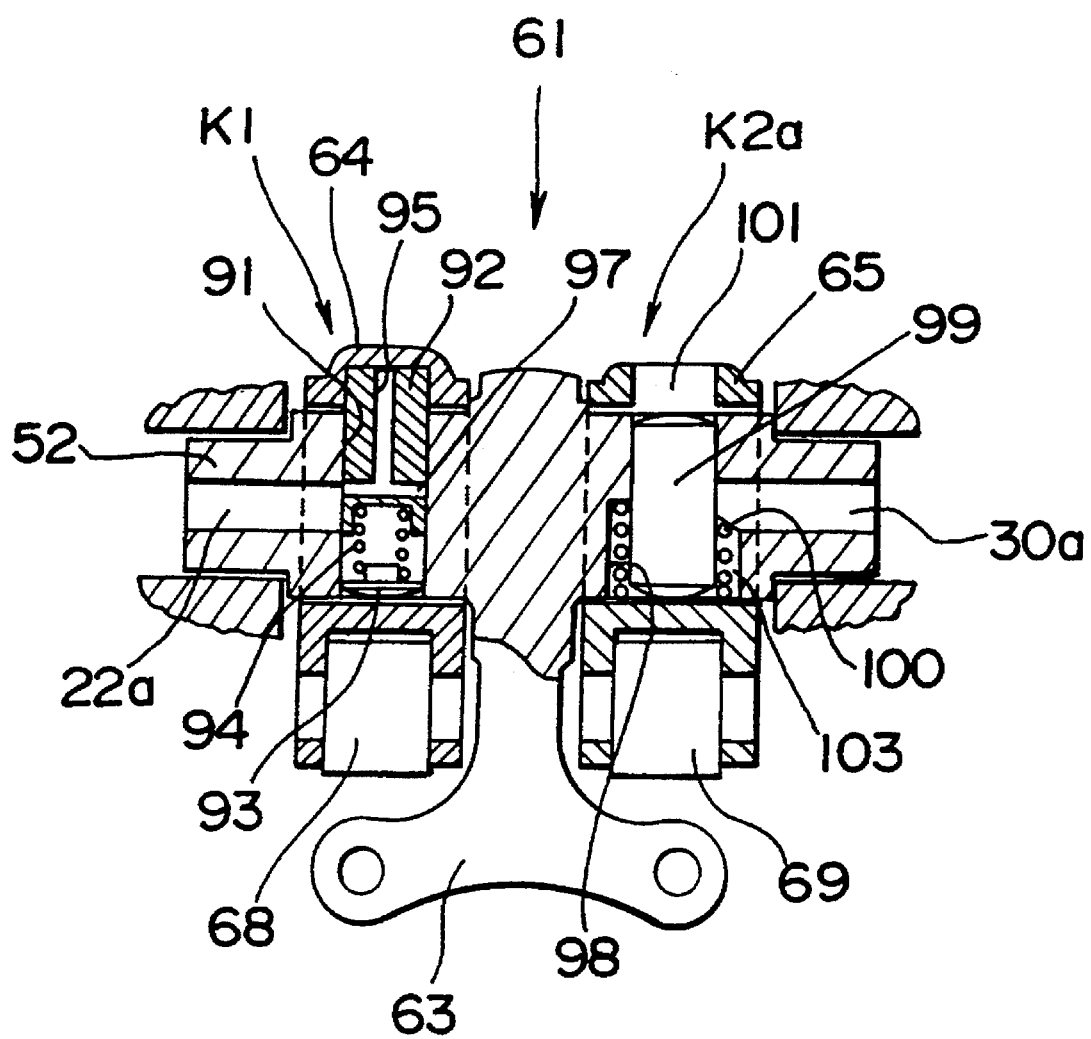
FIG. 8 is a cross-sectional view of a switching mechanism of the valve motion arrangement.
Figure 9:
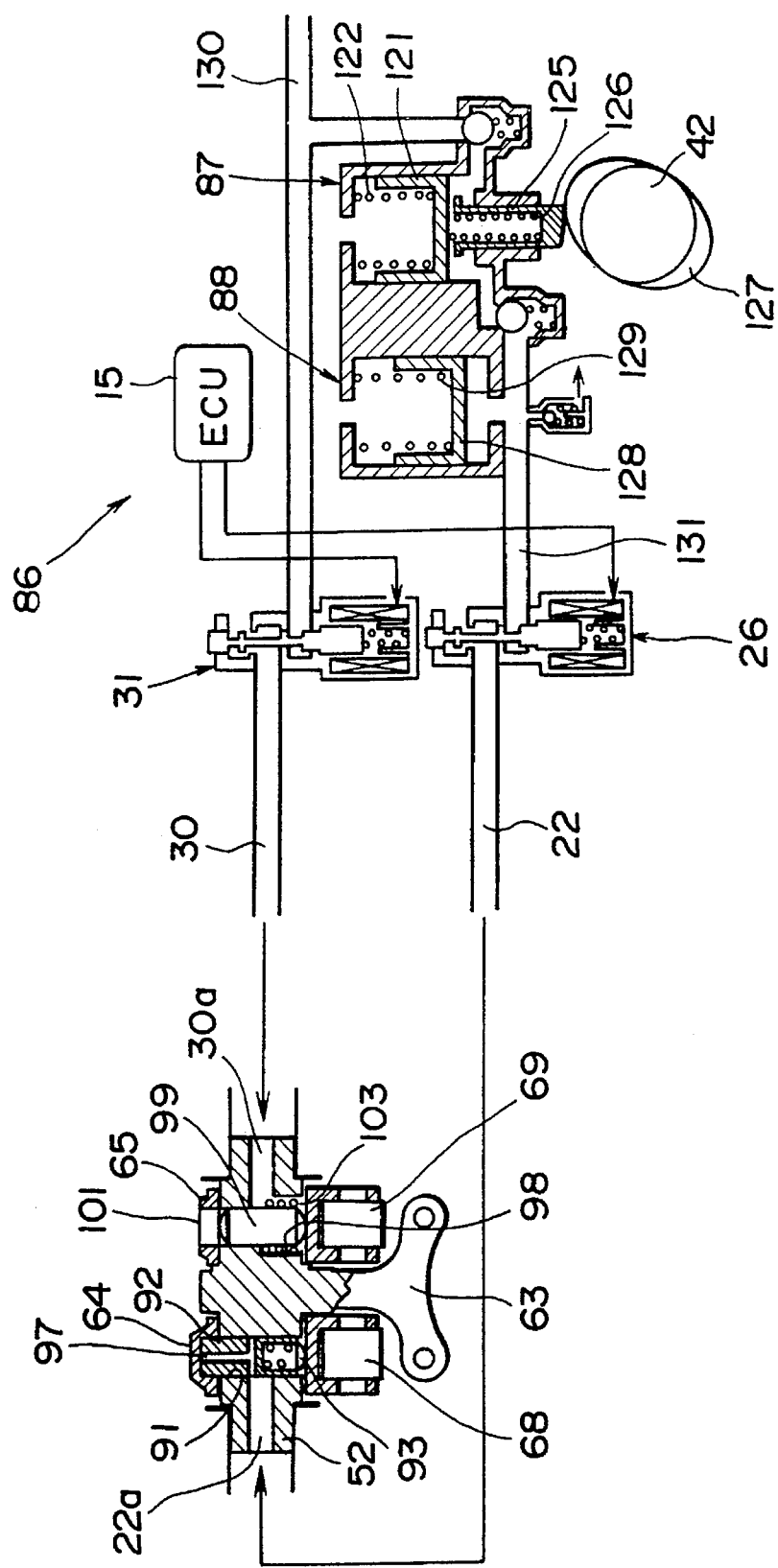
FIG. 9 is a schematic view representing a hydraulic circuit of the valve motion arrangement.

As shown in FIG. 8, the low speed rocker arm 64 and the high speed rocker arm 65 are designed to be capable of rotating together with the rocker shaft 52 by the switching mechanisms K1 and K2, respectively. The rocker shaft 52 is formed with a through hole 91 in such a manner that the through hole 91 is positioned correspondingly to the position of the low speed rocker arm 64 and extends in the radial direction of the rocker shaft 52. A rock pin 92 is movably received in the through hole 91 and is forced to move in a direction by a compression spring 94 supported by a spring sheet 93. On the other hand, the low speed rocker arm 64 is formed with an engaging hole 95 which is positioned correspondingly to the through hole 91 to be engaged with the rock pin 92 forced to move by the compression spring 94. The rocker shaft 52 is formed along the axis of the rocker shaft 52 with an oil pressure passageway 22*a* which is held in communication with the through hole 91. The rock pin 92 is formed with an oil passageway 97 which is held in communication with the hydraulic oil passageway 22*a* and has an opening facing to the engaging hole 95.

Additionally, the rocker shaft 52 is formed with a through hole 98 positioned correspondingly to the position of the high speed rocker arm 65 and extending along the radial direction of the rocker shaft 52. A rock pin 99 is movably received in the through hole 98 and is forced to move in a direction by a compression spring 100. On the other hand, the high speed rocker arm 65 is formed with an engaging hole 101 positioned in opposing relationship to the through hole 98 of the rocker shaft 52. The rock pin 99 is urged away from the engaging hole 101 by the compression spring 100. The rocker shaft 52 is formed with an oil pressure passageway 30*a* which is held;is held in communication with the through hole 98 and extends along the axis of the rocker shaft 52 and with an oil passageway 103 which is held in communication with one end portion of the through hole 98 remote from the engaging hole 101.

Figure 10A:
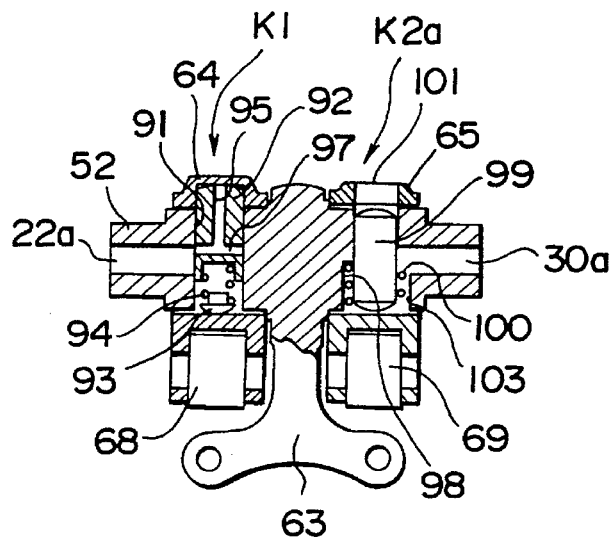
FIG. 10 (a) is a cross-sectional view of the switching mechanism representing an operation thereof in a low revolution speed condition.
FIG. 10(b) is similar to FIG. 10(a) but represents another operation of the switching mechanism in a high revolution speed condition.
FIG. 10(c) is similar to FIG. 10 (a) but represents a further operation of the switching mechanism in a partial cylinder unworking condition.
Figure 10B:
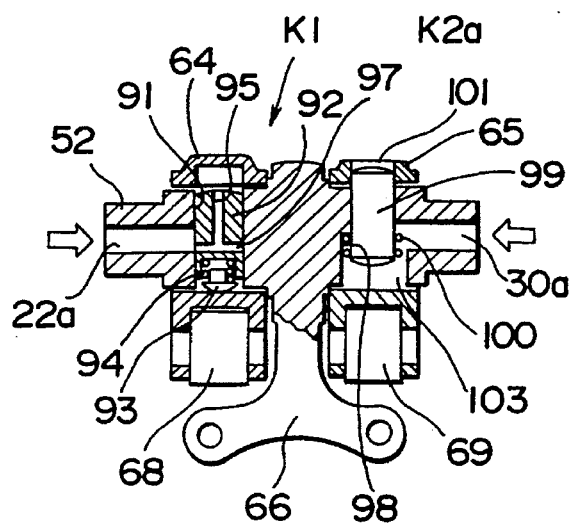
Figure 10C:
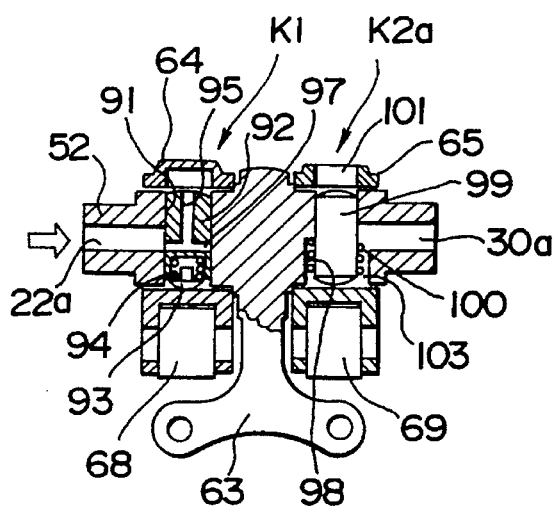

According to the structure of the valve motion arrangement as illustrated in FIG. 10(*a*), normally, the rock pin 92 is urged and engaged with the engaging hole 95 by the compression spring 94, thereby causing the low speed rocker arm 64 and the rocker shaft 52 to be fixedly coupled and making it possible to rotate the low speed rocker arm 64 together with the T-shaped lever 63 through the rocker shaft 52. On the other hand, the rock pin 99 is urged and disengaged from the engaging hole 101 by the compression spring 100, thereby causing the high speed rocker arm 65 and the rocker shaft 52 to be uncoupled and preventing the high speed rocker arm 65 from rotating with the rocker shaft 52. Therefore, the low speed cam 44 and the high speed cam 45 can force respectively the low speed rocker arm 64 and the high speed rocker arm 65 to pivot, whereas, T-shaped lever 63 receives and is pivoted by power transmitted to the low speed rocker arm 64.

If pressurized oil is supplied to each of the oil pressure passageways 22*a* and 30*a* of the rocker shaft 52 corresponding to the low speed rocker arm 64, the pressurized oil flows into the one end portion of the through hole 91 in the vicinity of the engaging hole 95 by way of the oil passageway 97, as illustrated in FIG. 10(*b*), thereby disengaging the rock pin 92 from the engaging hole 95 against the compression spring 94. As a: result, the low speed rocker arm 64 is disengaged from the rocker shaft 52, thereby preventing the rocker shaft 52 from rotating together with the low speed rocker arm 64. On the other hand, pressurized oil flows into one end portion of the through hole 98 remote from the engaging hole 101 through the oil passageway 103 so as to engage the rock pin 99 with the engaging hole 101 against the compression spring 94. Then, the high speed rocker arm 65 and the rocker shaft 52 are engaged with each other, thereby making it possible to concurrently rotate the high speed rocker arm 65 and the rocker shaft 52 together with each other. Accordingly, the low speed cam 44 and high speed cam 45 cause the low speed rocker arm 64 and the high speed rocker arm 65 to pivot around the axis of the rocker shaft 52, whilst, only a power transmitted to the high speed rocker arm 64 is transmitted to the T-shaped lever 63 by way of the rocker shaft 52, thereby making it possible to cause the T-shaped lever 63 to pivot around the axis of the rocker shaft 52.

If, in addition, the pressurized oil is supplied only to the oil pressure passageway 22*a* corresponding to the low speed rocker arm 64, the pressurized oil flows into one end portion of the through hole 91 in the vicinity of the engaging hole 95, as shown in FIG. 10(*c*), thereby causing the rock pin 92 to disengage from the engaging hole 95 against the compression spring 94. As a result, the low speed rocker arm 64 and the rocker shaft 52 are disengaged from each other, thereby preventing the low speed rocker arm 64 from rotating together with the rocker shaft 52. On the other hand, the rock pin 99 corresponding to the high speed rocker arm 65 is urged and disengaged from the engaging hole 101 by the compression spring 100 so as to disengage the rocker arm 65 from the rocker shaft 52, thereby preventing the rocker arm 65 and the rocker shaft 52 from concurrently rotating together with each other. Therefore, the low speed cam 44 and the high speed cam 45 cause respectively the low speed rocker arm 64 and the high speed rocker arm 65 to pivot, whilst, powers transmitted to the low speed rocker arm 64 and the high speed rocker arm 65 are not transmitted to the rocker shaft 52, thereby preventing the T-shaped lever 63 from pivoting and making it possible to cause the cylinder corresponding to the high speed rocker arm 65 to be held in its unworked cylinder condition.

Figure 11:
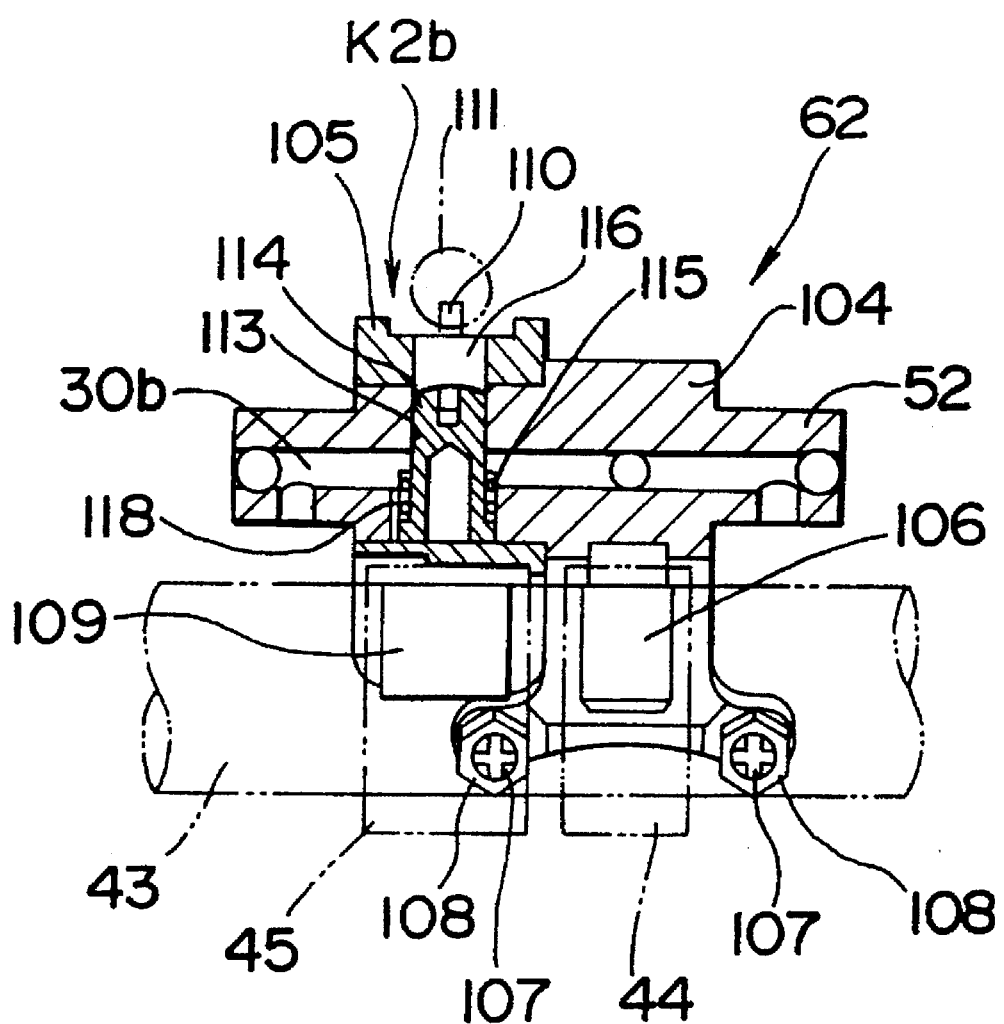
FIG. 11 is a sectional view of a valve motion arrangement without the cylinder suspending mechanism.

In the valve motion system 62 having no unworked cylinder mechanism, as shown in FIG. 11, a T-shaped lever (L) 104 seen generally as a letter "T" in a plan view, comprises an exhaust rocker shaft portion 52 rotatably supporting a high speed rocker arm 105, and an arm portion 52*a* extending from the central portion of the exhaust rocker shaft portion 52 in a direction at a right angle to the axis of the rocker shaft 52. A roller bearing 106 is attached to the free end portion of the T-shaped lever (L) 104 and is designed to engage with a low speed cam 44. Adjusting screws 107 are attached to the free end portion of the T-shaped lever 104 by nuts 108 and have lower end portions which are held in contact with upper end portions of exhaust valves 80, respectively, described hereinafter.

On the other hand, the high speed rocker arm 105 has one end portion rotatably supported by the rocker shaft 52 and the other end portion assembled with a roller bearing 109 which is designed to engage with the high speed cam 45. Additionally, the high speed rocker arm 105 has one end portion integrally formed with an arm portion 110 and the other end portion assembled with a roller bearing 109 in such a manner that the arm portion 110 and the roller bearing 109 is opposing to each other through the rocker shaft 52. The arm portion 110 is urged by the arm spring 111 to force the high speed rocker arm 105 to rotate in one direction. A switching mechanism K2*b* can cause the high speed rocker arm 105 and the rocker shaft 52 to concurrently rotate together with each other. The rocker shaft 52 is formed with a through hole 113 positioned correspondingly to the high speed rocker arm 105. A rock pin 114 is slidably provided in the through hole 113 and is forced to slide in one direction by a compression spring 115. On the other hand, the high speed rocker arm 105 is formed with an engaging hole 116 and the rock pin 114 is normally urged and disengaged from the engaging hole 116 by the compression spring 115. The rocker shaft 52 is formed with an oil pressure passageway 30*b* extending along the axis of the rocker shaft 52 to be held in communication with the through hole 113. In addition, the rocker shaft 52 is formed with an oil passageway 118 that is held in communication with one end portion of the through hole 113 remote from the engaging hole 116.

Normally, the rock pin 114 is urged and disengaged from the engaging hole 116 by the compression spring 115, so that the high speed rocker arm 105 can be disengaged from the rocker shaft 52, thereby cause the high speed rocker arm 105 and the rocker shaft 52 to concurrently rotate with each other. Accordingly, the low speed cam 44 and the high speed cam 45 cause the T-shaped lever (L) 104 and the high speed rocker arm 105 to pivot, whereas, power transmitted only to the low speed cam 104 is transmitted to the exhaust valve 80, so that the exhaust valve 80 can be pivoted by the transmitted power. If pressurized oil is supplied into the oil pressure passageway 30 of the rocker shaft 52, the pressurized oil flows into one end portion of the through hole 113 remote from the engaging hole 116 and forces the rock pin 114 to be engaged with the engaging hole 116, thereby making it possible to cause the high speed rocker arm 105 and the rocker shaft 52 to be fixedly coupled with each other. Therefore, the high speed cam 45 causes the high speed rocker arm 105 to pivot, so that power can be transmitted to the exhaust valve 80 through the rocker shaft 52 and the T-shaped lever 104 and to drive the exhaust valve 80.

In above descriptions of the valve motion systems 61 and 62, an exhaust side construction of the systems has merely been explained, whilst, an intake side construction of the system is similar to the exhaust side construction except that the cams 44 respectively attached to the camshafts 42 and 43 have nose portions, respectively, at different relative positions with respect to the axes of the camshafts 42 and 43, respectively, and except that the cams 45 attached to respectively the camshafts 42 and 43 have nose portions, respectively, at different relative positions with respect to the axes of the camshafts 42 and 43, respectively, in response to opening and closing timing of the exhaust and intake valves.

In the meantime, the intake valve 79 and the exhaust valve 80 are movably provided in the cylinder head 13 and are forced to close an intake port 83 and the exhaust port 84, respectively, by valve springs 81 and 82, respectively, as shown in FIG. 6. When, accordingly, the aforementioned T-shaped lever 63 (T-shaped lever (L) 104) presses the upper end portions of the intake valve 79 and the exhaust valve 80, the intake port 83 and the exhaust port 84 are opened by the valves 79 and 80, respectively, thereby making it possible to hold the intake port 83 and the exhaust port 84 in communication with a combustion chamber 85.

As shown in FIGS. 1, 2, 3, 9 and 12, the cylinder head has a rear portion (seen as an upper portion in FIG. 12) equipped with an oil pressure controlling apparatus 86 for operating the switching mechanisms K1, K2 and K2b of the valve motion systems 61 and 62. The oil pressure controlling apparatus 86 comprises an oil pump 87, an accumulator 88, the foregoing second electromagnet valve 31 and the foregoing first electromagnet valve 26.

The oil pump 87 and the accumulator 88 are positioned between the intake camshaft 42 and the exhaust camshaft 44 in such a manner as to be arranged in the vertical direction of the cylinder heads 13 and to respectively have axes parallel to the horizontal direction of the cylinder head 13, so that the cylinder head 13 is assembled with the cam cap housings 46 and cam caps 47. The oil pump 87 has a cylinder 121 horizontally movably provided therein and forced to horizontally move by a compression spring 122 and is attached to the side portions of the rearmost cam cap housing 46 and the rearmost cam cap 47 by the bolts 124 through the cover 123. The cylinder 121 oil the oil pump 87 is urged by a plunger 126 through the compression spring 125. The plunger 126 is designed to be moved by an oil pump cam 127 integrally formed with one end portion of the intake camshaft 42.

Additionally, the accumulator 88 positioned below the oil pump 87 has a cylinder 128 horizontally movably provided therein and forced to horizontally move by a compression spring 129 and is attached to the side portions of the rearmost cam cap housing 46 and the rearmost cam cap 47 by the bolts 124 through the cover 123. The cylinder 121 of the oil pump 87 and the cylinder 128 of the accumulator 88 are equal in diameter and can be used in common. The second electromagnet valve 31 and the first electromagnet valve 26 are attached to the cylinder head 11.

As shown in FIGS. 1, 2, 3 and 9, the second electromagnet valve 31 is directly held in communication with an oil pump 120 of the engine through an oil passageway 130 and is held in communication with the oil pressure passageway 30a through the oil pressure circuit 30. The first electromagnet valve 26 is held in communication with the accumulator 88, the oil pump 87 and the main oil pump 120 through an oil passageway 131 and is also held in communication with the oil pressure passage way 22a through the oil pressure circuit 22. The electromagnet valves 26 and 31 are designed to be operated by the control signal outputted from the ECU 15.

Figure 3:
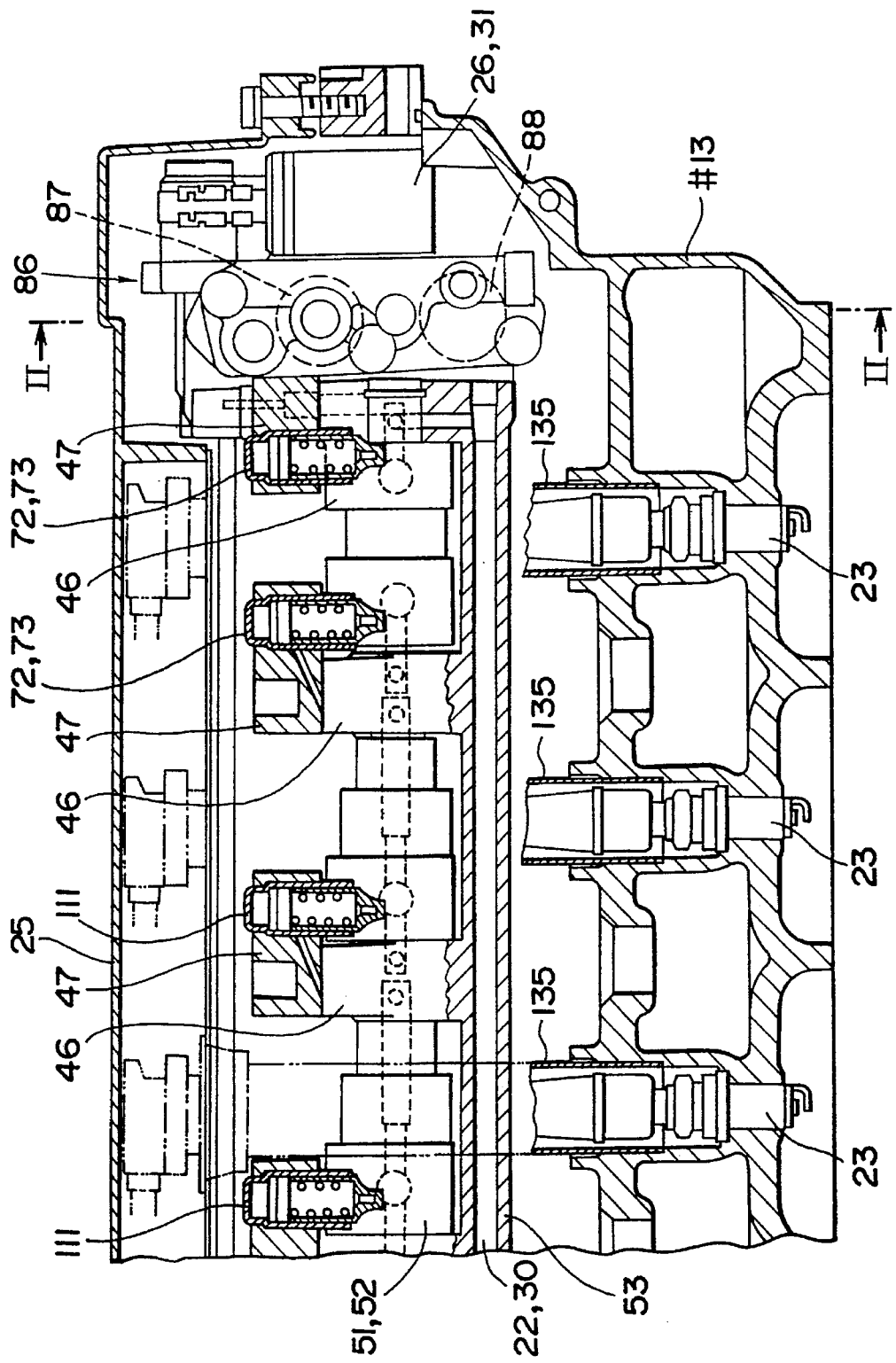
FIG. 3 is a cross-sectional view (take a long a line III—III in FIG. 12) showing the central part of the cylinder head.
Figure 4:
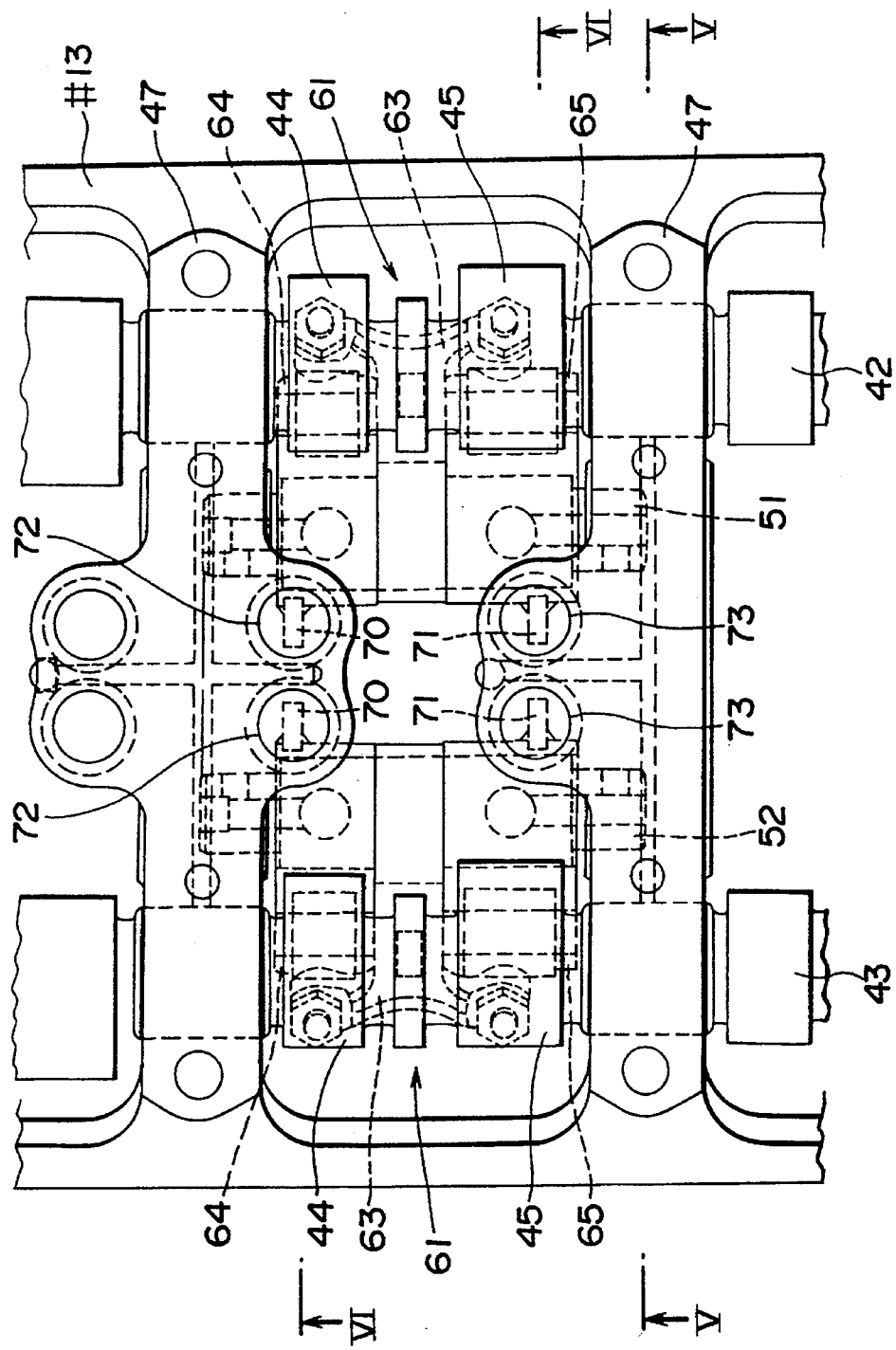
FIG. 4 is a plan view illustrating the valve motion arrangement having a cylinder suspending mechanism.
Figure 5:
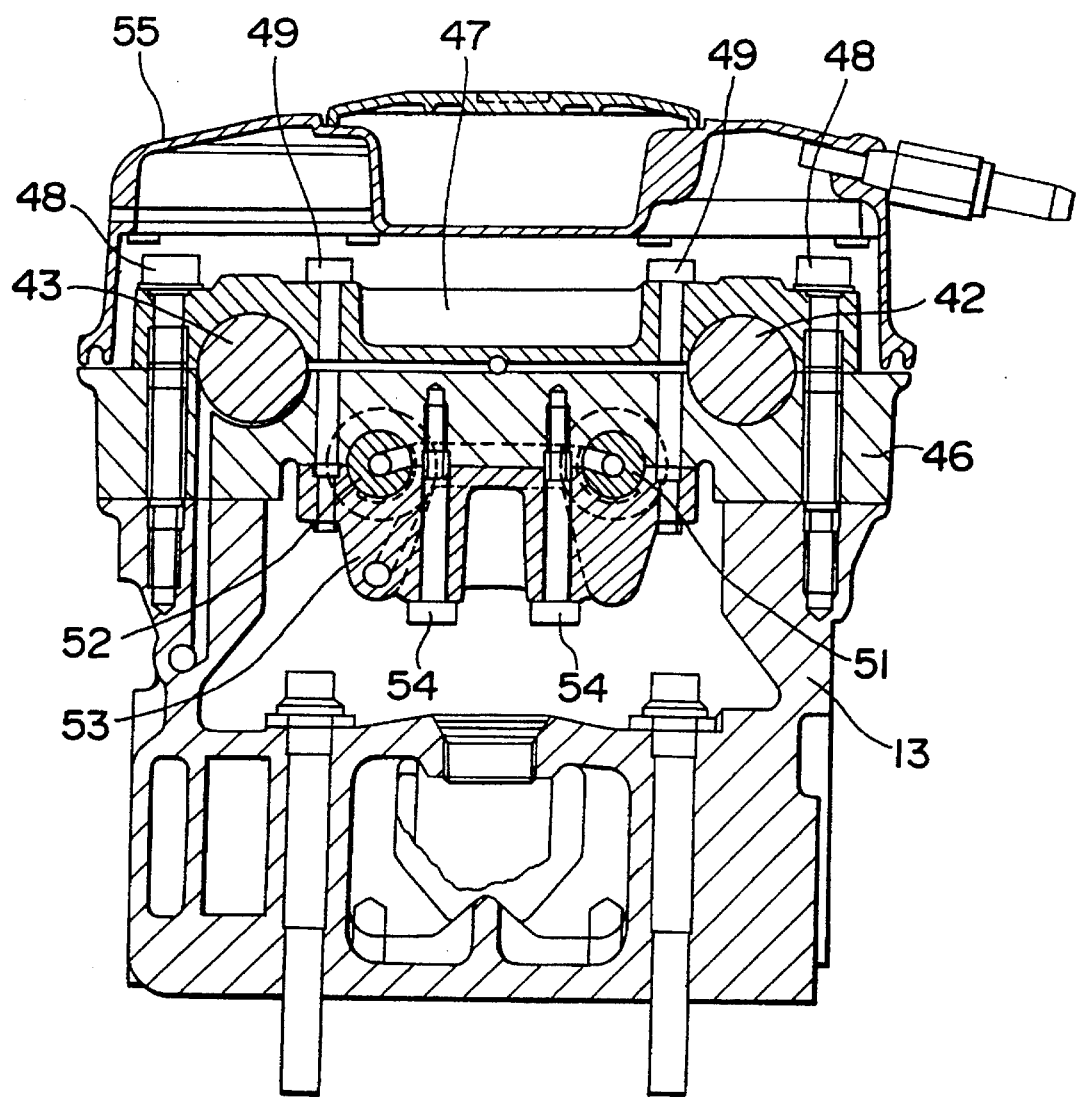
FIG. 5 is a cross-sectional view taken a long a line V—V in FIG. 4.

The valve motion arrangement 62 is designed to be operated by the oil pressure controlling apparatus 86 in a similar manner to the valve motion arrangement 61. The oil pressure passageway 30b of rocker shaft 52 is held in communication with the second electromagnet valve 31 through the oil pressure circuit 30. As shown in FIG. 3, the cylinder head 13 is assembled with hollow plug tubes 13 each corresponding to each of the cylinders in such a manner that one end portions of the plug tubes are embedded in the cylinder head 13. The ignition plugs 23 are respectively inserted into the plug tubes 135, thereby causing each of electrode side end portions of the ignition plugs 23 to be positioned in each of combustion chambers 85.

The operation of the four-cylinder engine will be explained hereinlater. The ECU 15 detects the running condition of the engine on the basis of outputs of various sensors. If the ECU 15 recognizes that the engine is running in a low revolution speed condition, the ECU 15 selects cams each having a profile corresponding to the revolution speed of the engine. In this case, the ECU 15 outputs control signals to the electromagnet valves 26 and 31 and causes the electromagnet valves 26 and 31 to close. As a result, pressurized oil is not supplied to the oil pressure passageways 22a, 30a and 30b. In the valve motion arrangement 61, the rock pin 92 permits the low speed rocker arm 64 and the rocker shaft 52 to be fixedly coupled with each other as shown in FIG. 10(a), while that the high speed rocker arm 65 and the rocker shaft 52 are disengaged from each other. If, therefore, the camshafts 42 and 43 are rotated, only the low speed rocker arm 64 is pivoted by the low speed cam 44. Power transmitted to the rocker arm 64 from the low speed cam 44 is further transmitted to the T-shaped lever 63 through the rocker shaft 52 and causes the T-shaped lever 63 to pivot, so that the pair of adjust screws 66 attached to one end portion of the T-shaped lever 63 can move the intake valve 79 and the exhaust valve 80. In the valve motion arrangement 62, the high speed rocker arm 105 and the rocker shaft 52 are disengaged from the each other as shown in FIG. 11. If the camshafts 42 and 43 are rotated, the T-shaped lever (L) 104 is pivoted by the low speed cam 44, and then the pair of adjust screws 107 attached to one end portion of the T-shaped lever (L) 104 force the intake valve 79 and the exhaust valve 80 to be moved. Thus, the intake valve 79 and the exhaust valve 80 are opened and closed at the valve timings corresponding to the low revolution speed condition, thereby causing the engine to run at the low revolution speed.

If the ECU 15 detects that the engine is running at a high revolution speed, the ECU 15 outputs control signals to the electromagnet valves 26 and 31 so as to cause the electromagnet valves 26 and 31 to open, and then pressurized oil is supplied to the oil pressure passageways 22a, 30a and 30b. When the engine is running at the high revolution speed, the rock pin 92 of the valve motion arrangement 61 is urged away from the engaging hole 95 by the pressurized oil as shown in FIG. 10(*b*), so that the low speed rocker arm 64 can be disengaged from the rocker shaft 52. While, the rock pin 99 is engaged with the engaging hole 101, thereby causing the high speed rocker arm 65 and the rocker shaft 52 to be fixedly coupled with each other. Accordingly, the high speed cam 45 pivots the high speed rocker arm 65 and further pivots the T-shaped lever 63 through the high speed rocker arm 65, thereby causing the intake valve 79 and the exhaust valve 80 to move. In the valve motion arrangement 62, the rock pin 114 is urged toward the engaging hole 116 by pressurized and supplied oil, thereby permitting the high speed rocker arm 105 and the rocker shaft 52 to be fixedly coupled with each other. Therefore, the high speed cam 45 pivots the high speed rocker arm 105 and moves the intake valve 79 and the exhaust valve 80 therethrough. Thus, the intake valve 79 and the exhaust valve 80 are opened and closed at valve timings corresponding to the high revolution speed condition, thereby causing the engine to run at the high revolution speed.

Figure 13:
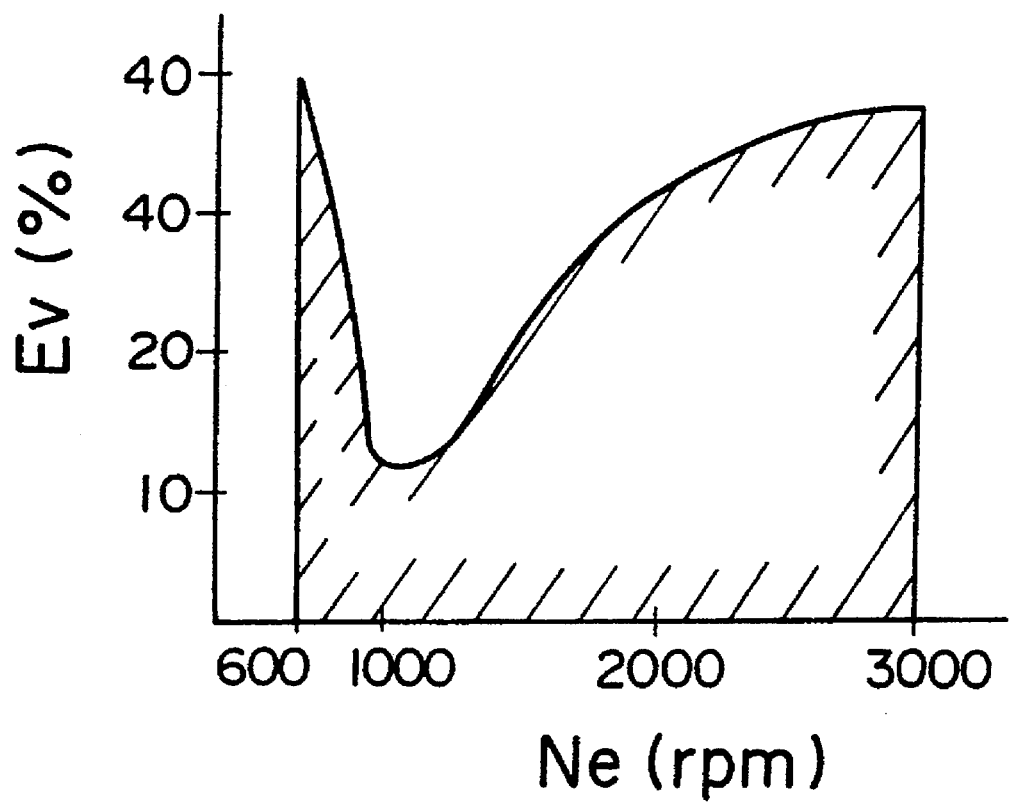
FIG. 13 is a diagram representing a running mode map used by the ECU of the automotive vehicle engine shown in FIG. 1.

In the meantime, the ECU 15 forming a controlling apparatus determines an all cylinder working mode or a partial cylinder unworking mode in response to the revolution speed and the boost pressure data of the engine with reference to a running mode map (shown in FIG. 13). The ECU 15 also determines retard amount decreased with the lapse of time on the basis of an ignition retard map (shown in FIG. 14) and determines correction value in response to the boost pressure data with reference to a retard correction map (shown in FIG. 15) for correcting the retard amount. Both when the stroke number counted after determination of a switch from the partial cylinder mode to the all cylinder mode is within a predetermined range: and when the engine is held in an idle running condition a1 or an acceleration running condition a2 corresponding to a predetermined retard correction condition, the ECU 15 controls the ignition driving apparatus in such a manner that the electric sparks are produced in the engine at target ignition timings calculated on the basis of the retard amount decreased with the lapse of time, the retard correction amount and the standard ignition timing.

The ECU 15 uses the running mode map shown in FIG. 13 and determines the all cylinder mode or the partial cylinder mode in response to the revolution speed of the engine detected by the revolution sensor 12 and volume efficiency (Ev) based on data of the boost pressure Pb detected by the vacuum sensor 10.

The running mode map is designed to be capable of giving the determination of the all cylinder mode or the partial cylinder mode in ,response to the revolution speed of the engine and the volume efficiency (Ev) of air calculated on the basis of the boost pressure Pb. A hatched zone in FIG. 13 corresponds to the running condition in which the partial cylinder mode is to be selected. In FIG. 13, the volume efficiency (Ev) is instantly increased in the low revolution speed condition in order to increase the revolution speed at one time in the case that the all cylinder working mode is switched to the partial cylinder unworking mode, thereby preventing the revolution speed of the engine from abruptly decreasing at the time when one of the running modes is switched to another running mode.

The ECU 15 further uses the ignition retard map shown in FIG. 14 for a reason as follows. If the engine is held in a period of transition condition such as at the time when the running mode of the engine is returned from the partial cylinder unworking condition to the all cylinder working condition as shown in FIG. 16(D), the boost pressure is not responsively decreased after the partial cylinder unworking mode is switched to the all cylinder working mode (as referred to FIG. 16(C)). In order to enhance the responsiveness of the boost pressure, the ECU 15 controls the ignition timing of the engine in such a manner as will be described hereinlater.

Figure 16A:
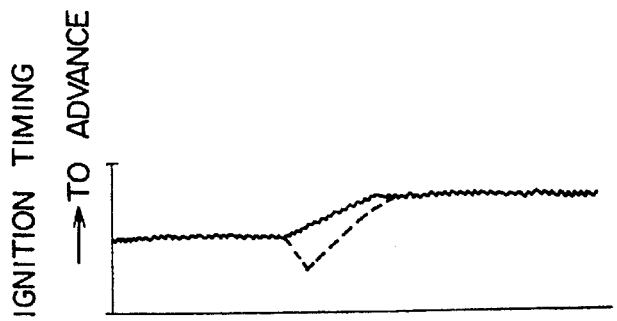
FIGS. 16(A) to 16(D) are diagrams representing respectively variations of ignition timing, torque, boost pressure and all/partial cylinder working mode controlled by the ECU of the automotive vehicle engine shown in FIG. 1.
Figure 16B:
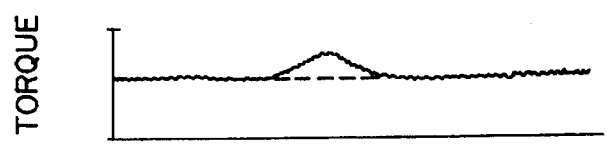
Figure 16C:
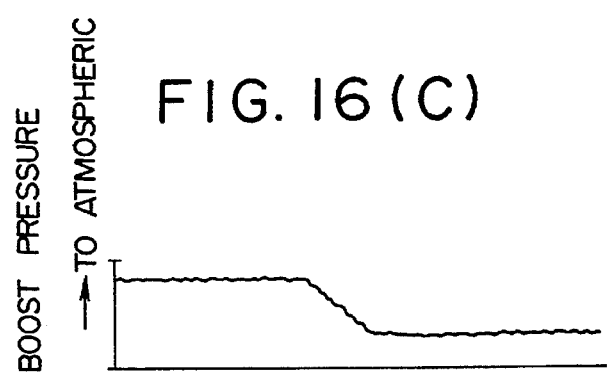
Figure 16D:
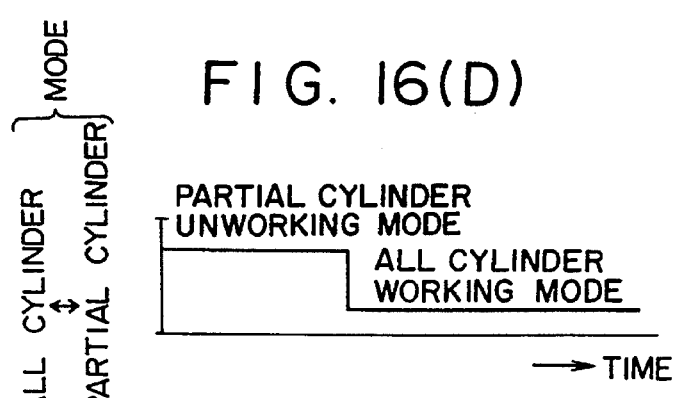

If combustion strokes are carried out at the ignition timing determined in a normal running condition (the all cylinders worked condition) as shown by a solid line in FIG. 16(A), rapid increase of air causes engine torque to rapidly increase as shown by a solid line in FIG. 16(B). In order to prevent the rapid increase of the engine torque, the ECU 15 retards the ignition timing as shown by a dash line in FIG. 16(A) and prevents the engine torque from being rapidly varied as shown by a dash line in FIG. 16(B).

Figure 14:
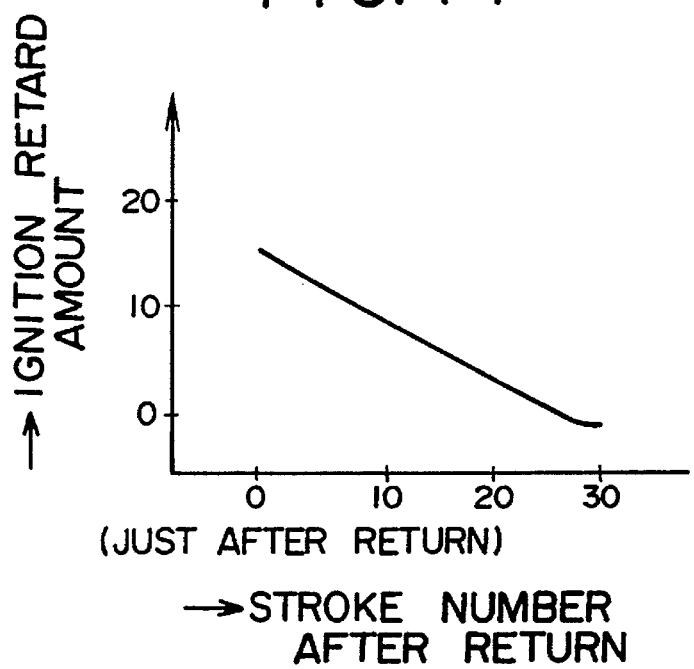
FIG. 14 is a diagram representing an ignition retard amount map used the ECU by of the automotive vehicle engine shown in FIG. 1.

For this reason, in the retard map used by the ECU 15, the retard amount is determined in conjunction with stroke number counted after the switch operation from the partial cylinder unworking mode to the all cylinder working mode in such a manner that the retard amount is at maximum level immediately after the switching operation and thereafter is decreased in response to the increase of the stroke number after the switching operation as shown in FIG. 14. Based on the retard amount, the ECU 15 is designed to adjust the desirable ignition timing (standard timing) under the normal running condition.

Figure 15:
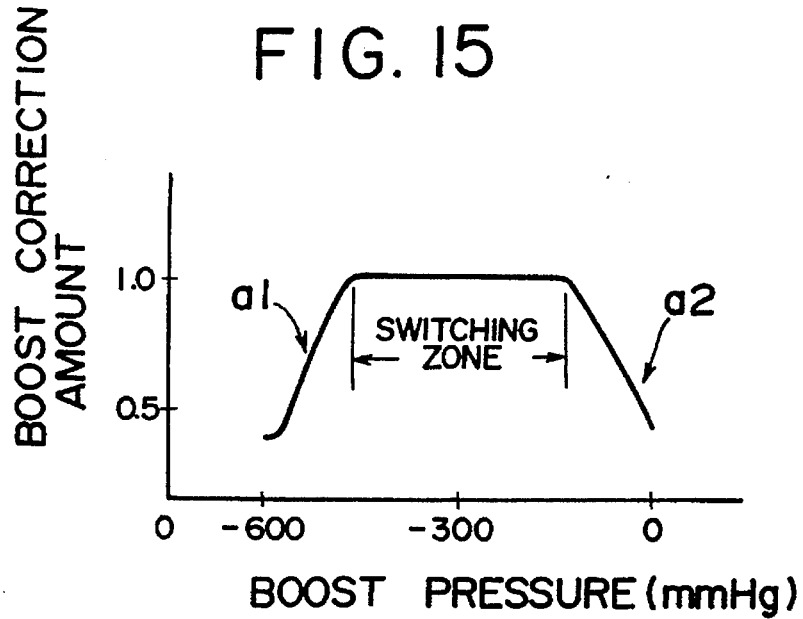
FIG. 15 is a diagram representing a boost correction map used by the ECU of the automotive vehicle engine shown in FIG. 1.

As shown in FIG. 15, the boost correction map used by the ECU 15 is determined in such a manner that the retard amount of the ignition retard map is further corrected and decreased when the engine is held in the idle running condition a1 or the acceleration running condition a2 not included in a predetermined appropriate retard correction zone.

The boost correction map is used when the partially cylinder unworking mode is switched to the all cylinder working mode under the condition that the engine is held in an idle running condition corresponding to the low revolution speed or in the acceleration running condition corresponding to the high engine revolution speed. In the idle running condition, the ignition timing is permitted to be retard in order to maintain the combustion of the engine at a stable state. In the acceleration running condition, it is necessary that the output power, i.e., the output torque requisite for the acceleration be produced by preventing the ignition delay caused by the intake manifold pressure. In these conditions, therefore, it is requested that the retard amount of the ignition timing be decreased to the standard timing in such a manner as to be equal to a value corresponding to the normal running condition. As a result, the retard amount is to be corrected.

When, therefore, the partial cylinder unworking mode is switched to the all cylinder working condition, the rapid variation of the output torque at the transition period is prevented by the retard of the ignition timing. At the same time, the retard amount is corrected in response to the running condition of the engine, thereby making it possible to maintain the engine at a running condition corresponding to the actual and desirable standard.

In this embodiment constituted as mentioned above, the process for controlling the ignition timing at the time when the partial cylinder unworking mode is switched to the all cylinder working condition will be explained with reference to the flowchart shown in FIG. 19.

In a step a1, based on the revolution speed of the engine and the air volume efficiency calculated on the basis of the boost pressure, the ECU 15 checks whether or not the engine is presently running in a condition corresponding to the partial cylinder unworking mode. If the engine is not running in the condition corresponding to the partial cylinder working mode, control leads to a step a2. In the step a2, determination is made on whether or not the stroke number counted after the mode is returned to the all cylinder working condition exceeds "30". If, in the step a2, "NO" is selected, i.e., the stroke number does not exceed "30", determination is made on whether or not one stroke is finished in a step s3. If, in the step s3, one stroke is finished, the stroke number is counted in such a manner that "1" is added to the stroke number in a step s4. In a step a5, the retard amount is calculated on the basis of the counted stroke number with reference to the ignition retard map shown in FIG. 14. In the aforementioned step a4, when the ECU 15 outputs a signal for returning the running mode to all cylinder working mode, the stroke number is counted.

If, in a step a6, based on an output signal from the boost sensor 10, the ECU 15 detects whether the engine is in the idle running condition or in the acceleration running condition, a retard correction amount is derived from the boost correction map shown in FIG. 15 and is multiplied by a retard amount calculated on the basis of the ignition retard map shown in FIG. 14, thereby making it possible to correct the retard amount at the present time. In a step a7, the corrected retard amount is subtracted from a base advance employed used in the normal running condition, thereby determining an ignition advance amount. Thus, based on the standard ignition timing and the corrected retard amount, a target ignition timing is calculated. The target ignition timing signal is transmitted to the igniters 24 and 25, so that the igniters 24 and 25 can spark spark plug corresponding to an a objective cylinder at the target ignition timing on the basis of an output signal of a crank angle sensor 20.

If, on the other hand, the engine is held in partial cylinder unworking condition in the step a1, the control is led to a step a8. In the step a8, the count of the stroke is reset after the running mode returns to the all cylinder working mode. In i step a9, the base advance amount used in the normal running condition is to define the ignition timing.

A water temperature sensor 11 electrically connected to the ECU 15 detects that the engine is running under the condition that the boost pressure is held in low level zones shown in FIG. 15. A throttle position sensor 8 can substitute for the boost sensor 10.

Next, another embodiment according to the present invention will be explained with reference to the flowchart shown in FIG. 20 and indicating the torque controlling process used in the switching operation from the all cylinder working mode to the partial cylinder unworking mode.

Figure 20:
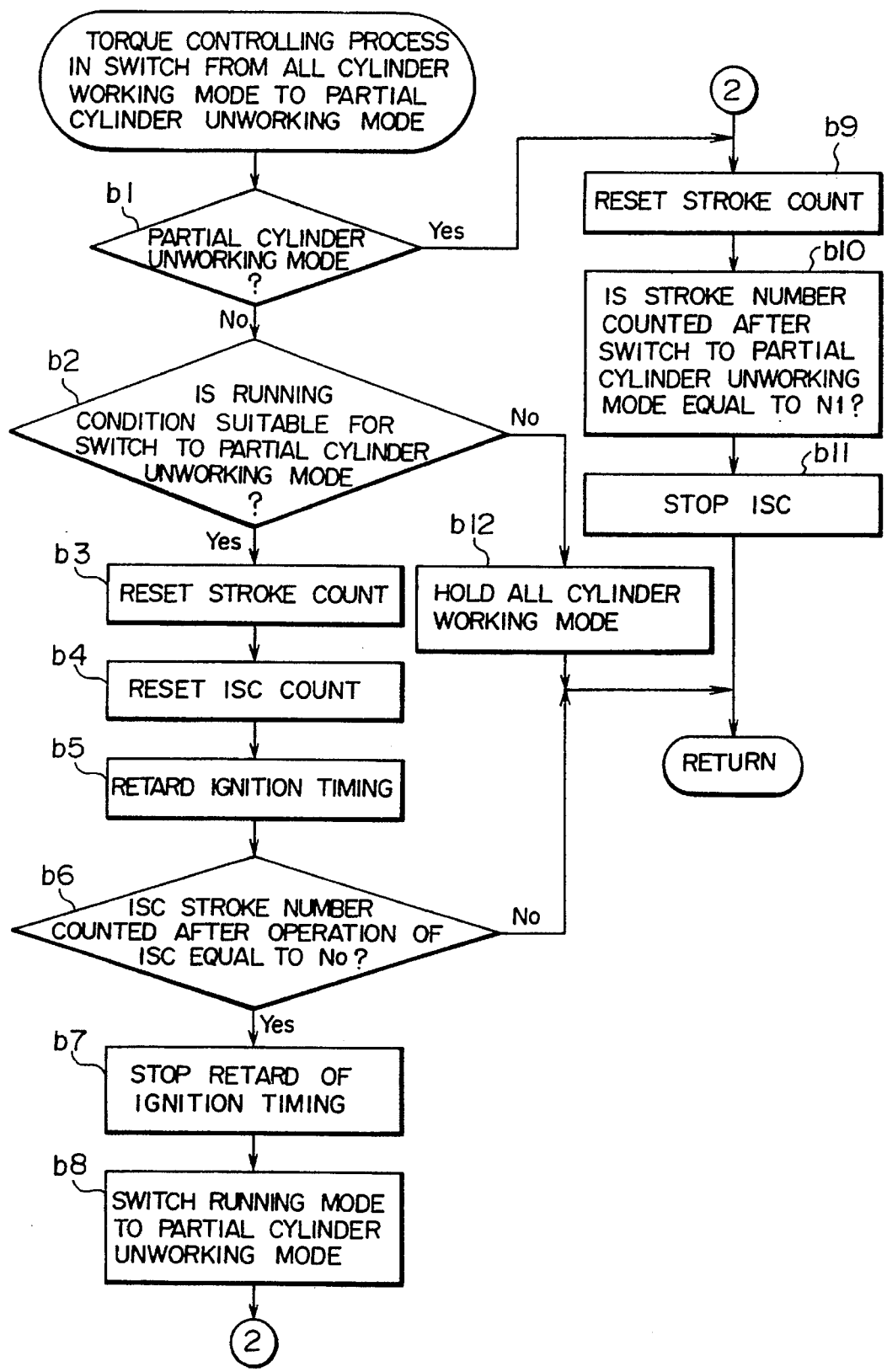
FIG. 20 is a flowchart representing the torque controlling process performed by the ECU of the automotive vehicle engine shown in FIG. 1 at the time when the all cylinder working mode to the partial cylinder unworking mode.

The torque controlling process shown in FIG. 20 is applied to the same vehicle engine as the engine shown in FIGS. 1 to 12, however, the ECU 15 the vehicle engine in this embodiment performs a process for determining a running mode and a process for controlling ignition timing which are different from those performed by the ECU 15 of the engine E. In this embodiment, therefore, the explanation for the same constitution as that of the aforementioned embodiment will be omitted in the following description.

Based on the running mode map (referred to FIG. 13), the ECU 15 forming the controlling apparatus of this embodiment determines the all cylinder working mode or the partial cylinder unworking mode in response to revolution speed of the engine and an air volume efficiency which is calculated on the basis of boost pressure, and corrects the intake air amount for an intake system on the basis of the torque correction map (referred to FIG. 17). The ECU 15 also determines a retard amount of the ignition timing and is designed to function as means for preventing the output torque of the engine from decreasing.

The running mode map employed in this embodiment is similar to that shown in FIG. 13.

The torque correction map employed in this embodiment and shown in FIG. 17 is determined in such a manner that the following operation is carried out. When the stroke number counted after determination for switching from all cylinder working mode to the partial cylinder unworking mode is within a predetermined stroke range, the intake air amount for the intake system is corrected by operating an idle revolution speed control (ISC) valve 4 after the switching operation. At the same time, the increase of the engine output torque caused at a combustion stroke in response to the increase of the intake air amount caused by the correction of the intake air amount is controlled by determining the retard amount of the ignition timing.

The retard amount of the ignition timing shown in FIG. 17(A) is increased after delay time (shown by a period D in FIG. 17(B)) with respect to the operation start timing of the idle speed controlling apparatus in consideration of an intake delay and the operation delay of the actuator of the idle revolution speed control (ISC) valve 4. In other words, the retard amount of the ignition timing is increased in proportion to the increase of the intake air amount caused by the operation of the idle revolution speed control (ISC) valve 4.

In this embodiment constituted as mentioned above, the torque controlling process in the switching operation from the all cylinder working mode to the partial cylinder unworking mode is performed by the ECU 15 will be explained hereinlater with reference to the flowchart shown in FIG. 20.

Initially, based on the revolution speed of the engine and the air volume efficiency (Ev) calculated on the basis of the boost pressure, determination is made on whether or not the engine is presently running in the partial cylinder unworking mode. If the engine is not running in the partial cylinder unworking mode, control advances to a step b2. In the step b2, determination is made on whether or not the partial cylinder unworking mode can be selected on the basis of revolution speed of the engine and the air volume efficiency based on the boost pressure with reference to the map shown in FIG. 13. If the partial cylinder unworking mode can be selected, the control is advanced to a step b3. In the step b3, the stroke number is initiated to be counted from the present time. In a step b4, the idle revolution speed control (ISC) valve 4 is operated, thereby increasing the intake air amount.

Figure 18:
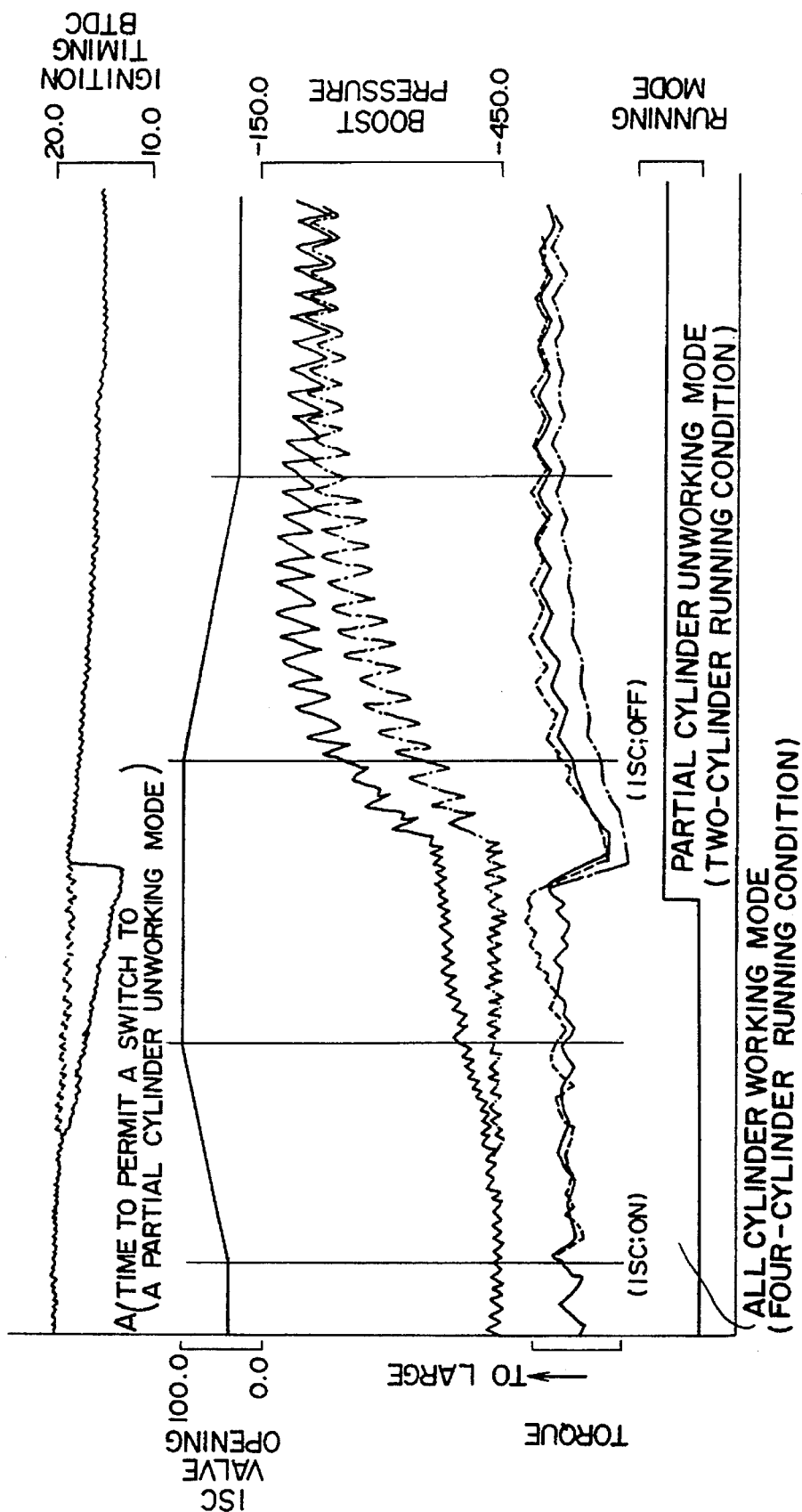
FIG. 18 is a diagram representing variations of boost pressure and output torque controlled respectively on the basis of the torque correction map and the retard amount of the ignition timing determined by the controlling apparatus of the automotive vehicle engine shown in FIG. 1 in comparison with those of a conventional automotive vehicle engine.

The correction caused by the operation start of the idle revolution speed control (ISC) valve 4 for increasing intake air amount is performed after a delay time corresponding to the operation delay of the idle revolution speed control (ISC) valve 4 and the like with respect to the operation start timing of the valve 4 as shown in FIG. 18. The boost pressure increases in proportion to the increase of the intake air amount caused by the correction (as shown by a solid line in FIG. 5). At the same time, excessive increase and decrease of the engine output torque is prevented (as shown by a solid line in FIG. 18). Each of solid lines shown in FIG. 18 is derived in the present embodiment, while, each of a single dot anti dash line shown in FIG. 18 is derived in the normal case that the retard amount of the ignition timing and the idle speed control are not used. The dash line shown in FIG. 18 and representing variation of the engine torque is derived in the case that the retard amount of the ignition timing the of present embodiment is not used.

The idle revolution speed control (ISC) valve 4 is designed to be capable of opening a bypass passageway bypassing a throttle valve and being held in communication with an intake passageway. The output torque of the engine increases in proportion to the increase of the boost pressure between the valve closing condition and the valve completely opening condition of the valve 4. When the idle revolution speed control (ISC) valve 4 is completely opened after the delay of the valve operation, the output torque of the engine increases as shown by the dash line in FIG. 18.

As mentioned above, in a step b5, the ECU 15 selects the torque correction map shown in FIG. 17(A) in response to the stroke number counted after the switching operation of the mode, calculates the retard amount of the ignition timing, and outputs signals to the igniters 24 and 25. In igniters 24 and 25, the ignition timings are adjusted on the basis of signals outputted from the crank angle sensor 20. In this condition, the retard amount (represented by the solid line showing the ignition timing) is remarkably varied in response to the stroke number as shown in FIG. 18.

If the control reaches a step b6, determination is made on whether or not the stroke number "No" counted after the operation start of the idle revolution speed control (ISC) valve 4 reached a predetermined number in order to derive timing for discontinuing to determinate the retard of the ignition timing.

At this time, the retard amount is instrumental in preventing the engine output torque from increasing in response to the increase of the boost pressure caused by the operation of the idle revolution speed (ISC) valve 4 as shown in FIG. 18, thereby making it possible to prevent output of the engine from varying.

Not only the decrease of torque shown by the dash line in FIG. 18 corresponding to the conventional engine is large in comparison with that of the present embodiment using the idle speed control and the retard amount, but also it takes the conventional engine a long time until the torque returns to an appropriate level in comparison with that of the present embodiment. In accordance with the present embodiment, the output torque of the engine can be rapidly remedied when the all cylinder working mode is switched to the partial cylinder unworking mode.

After the use of the retard amount of the ignition timing is discontinued in a step b7, the remedy for the output torque of the engine is completed. Therefore, the signal is outputted to the oil pressure controlling apparatus 86 so as to operate the switching mechanisms K1, K2a and K2b in such a manner that the all cylinder working mode is switched to the partial cylinder unworking mode.

When the control is led to a step b9 from the step b1 or b8 after the all cylinder working mode is switched to the partial cylinder unworking mode, the stroke number counter is reset, and then the control is led to a step b10. In the step b10, determination is made on whether or not the stroke number "N1" counted after the switching operation of the running mode reaches a predetermined stroke number. If the stroke number "N1" reaches the predetermined stroke number, the idle revolution speed control (ISC) valve 4 is stopped from operating. The predetermined stroke number is determined in such a manner that the stroke number "N1" reaches the predetermined stroke number at the time when the idle speed control is stopped from operating as shown in FIG. 18. After this time, the engine torque is maintained at a stable state as shown in FIG. 18.

In the engine provided with the controlling apparatus performing the torque controlling process shown in FIG. 20, the idle speed controlling process is performed at the time when the all cylinder working mode is switched to the partial cylinder unworking mode, thereby making it possible to rapidly remedy the decrease of the torque in comparison with that of the conventional engine shown by the dash line in FIG. 18. Additionally, the performance of the idle speed control makes it possible to make small the decrease of the torque caused by the switching operation to the partial cylinders working mode in comparison with that of the conventional engine.

Next, a further embodiment according to the present invention will be explained hereinbelow with reference to FIGS. 21, 19 and 20.

Figure 21:
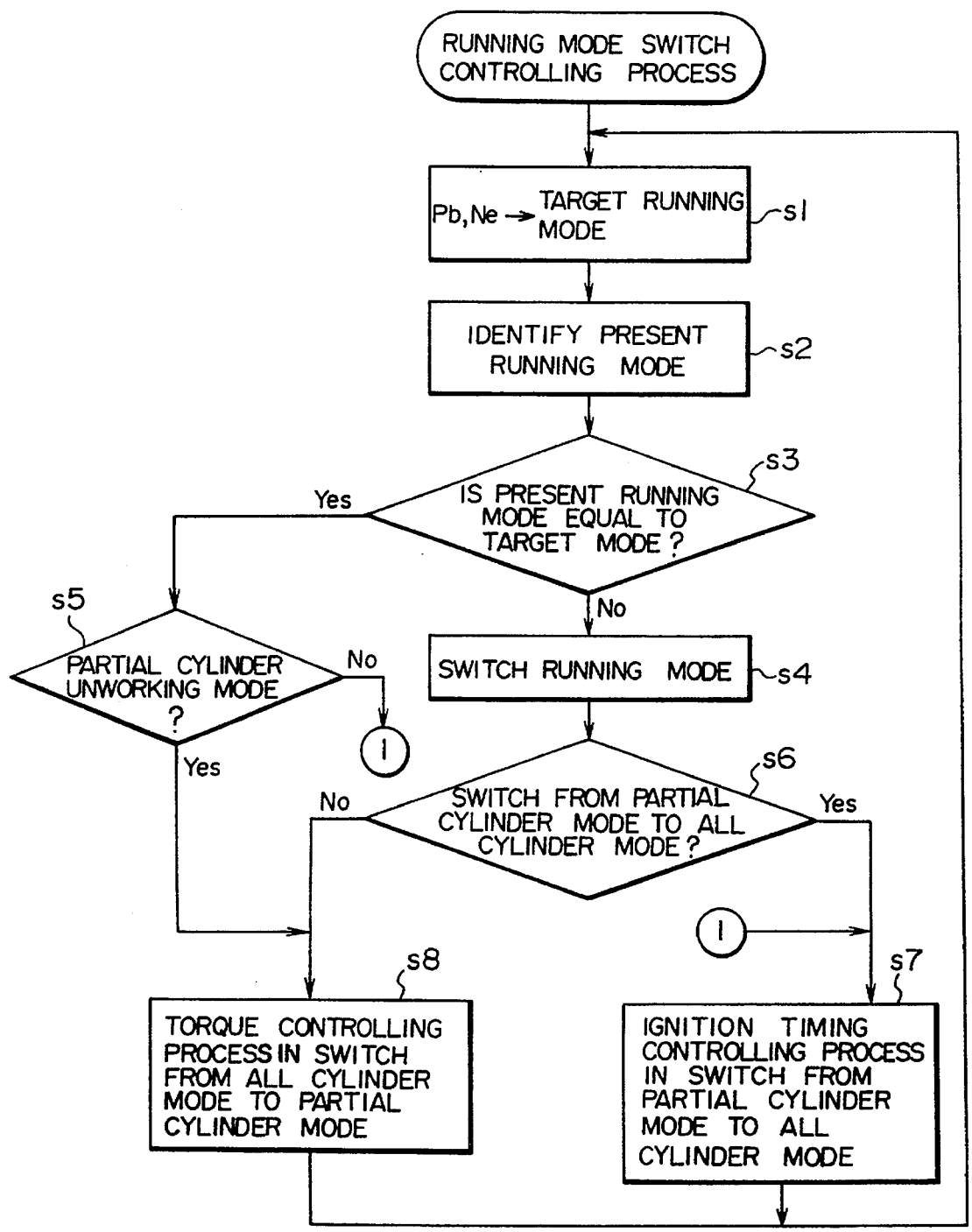
FIG. 21 is a flowchart representing the running mode switch controlling process performed by the ECU of the automotive vehicle engine shown in FIG. 1.

The running mode switching process shown in FIG. 21 includes the ignition timing controlling process performed in the switching operation from the partial cylinder unworking mode to all cylinder working mode and the torque controlling process performed in the switching operation from the all cylinder working mode to the partial cylinder unworking mode and is applied to the same vehicle engine as the engine E shown in FIGS. 1 to 12, however, the ECU 15 of the vehicle engine in the present embodiment performs the running mode determining process, the ignition timing controlling process and the idle speech controlling process which are different from those performed by the ECU of the engine E in the first embodiment. In this embodiment, therefore, the explanation for the same constitution as those of the aforementioned embodiments will be omitted in the following description.

Figure 19:
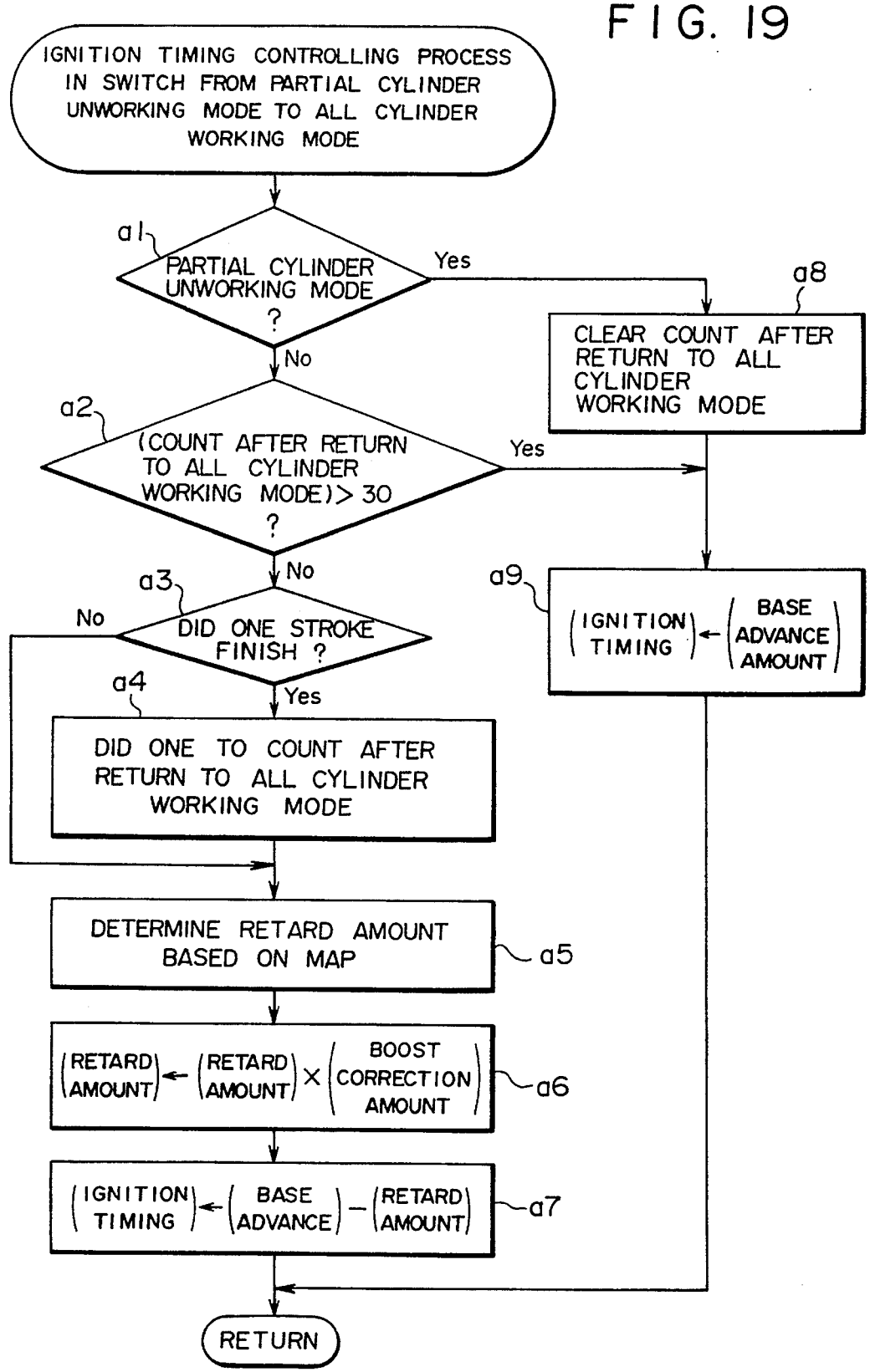
FIG. 19 is a flowchart representing the ignition timing controlling process performed by the ECU of the automotive vehicle engine shown in FIG. 1 at the time when the partial cylinder unworking mode to the all cylinder working mode.

The ECU 15 defining a controlling apparatus in this embodiment performs both controlling processes shown in FIGS. 19 and 20. That is, the ECU 15 determines an all cylinder working mode or a partial cylinder unworking mode on the basis of revolution speed of the engine and air volume efficiency (Ev) based on boost pressure with reference to an running mode map (referred to FIG. 13) and corrects intake air amount for an intake side system on the basis of a torque correction map (referred to FIG. 17). In addition, the ECU 15 derives a retard amount of the ignition timing defined in such a manner that the retard amount decreases with the lapse of in the ignition retard map (referred to FIG. 14). The ECU 15 also determines a correction value for correcting the retard amount on the basis of data of the boost pressure with reference to a retard correction map. Both when a stroke number counted after the switching operation from the partial cylinder unworking mode to the all cylinder working mode is within a predetermined stroke range and when the engine is held in the idle condition and the acceleration condition, the ECU 15 operates igniters in such a manner each of that spark plugs is sparked at a target ignition timing calculated on the basis of the retard amount and the retard correction amount multiplied to each other and the standard ignition timing.

The running mode map employed in this embodiment is similar to the map shown in FIG. 13 and used for determining all cylinder working mode or the partial cylinder unworking mode. The torque correction map employed in this embodiment is similar to the map shown in FIG. 17 and used for determining an opening amount of an idle revolution control (ISC) valve 4 and the retard amount of the ignition timing in the switching operation from the all cylinder working mode to the partial cylinder unworking mode. The ignition retard map employed in this embodiment is similar to the map shown in FIG. 14 and used for deriving the retard amount decreasing with the lapse of time in the switching operation from the partial cylinder unworking mode to the all cylinder working mode. The retard correction map employed in this embodiment is similar to the map shown in FIG. 15 and used for determining a correction value for correcting the retard amount on the basis of the boost pressure in the switch operation from the partial cylinder unworking mode to the all cylinder working mode.

In the present embodiment constituted as described above, the process carried out by the controlling apparatus will be explained hereinbelow with reference to the flowcharts shown in FIGS. 19, 20 and 21.

FIG. 21 represents a routine for controlling switches of running modes of the engine. The routine includes an ignition timing controlling process performed in the switching operation from the partial cylinder unworking mode to the all cylinder working mode. The routine also includes a torque controlling process in the switching operation from the all cylinder working mode to the partial cylinder unworking mode. These processes are performed in a similar manner to the processes shown in FIGS. 19 and 20. Therefore, the explanations for the same processes as those in the aforementioned embodiment will be omitted in the following description.

In steps s1 and s2, the ECU 15 determines the target running mode of the engine at the present time on the basis of the revolution speed of the engine and the air volume efficiency based on the boost pressure. In a step s3, determination is made on whether or not the present running condition coincides with the target running mode. If the present running condition does not coincide with the target running mode, control advances a step s4. If the present running condition coincides with the target running mode, the control advances a step s5. In a step s4, the oil pressure controlling apparatus 86 is operated for working the switching mechanisms K1, K2a and K2b in response to the target running mode, thereby causing the present running condition to be switched to the target running mode.

In a step s6, determination is made on whether or not the previous switch operation is the switching operation from the partial cylinder unworking mode to the all cylinder working mode. If "YES" is selected, the control advances to a step s7, whereas, if "NO" is selected, the control advances to a step s8. In the step s7, the ignition controlling process corresponding to the switching operation from the partial cylinder unworking mode to the all cylinder working mode is performed. In the step s8, the torque controlling process corresponding to the switching operation from the all cylinder working mode to the partial cylinder unworking mode is performed. Then, the control return to the step s1 from the steps s7 and s8.

In the case that the control advances to the step s5 after the present running condition corresponds to the target running mode, determination is made on whether or not the present running area corresponds to the partial cylinders worked. If "YES" is selected, the control is led to the step s8 representing the torque controlling process corresponding to the switching operation from the all cylinder working mode to the partial cylinder working mode. If "NO" is selected, the control advances to the step s7 representing the ignition controlling process corresponding to the switching operation from the all cylinder working mode to the partial cylinder unworking mode.

The process shown in FIG. 19 is used as the aforementioned ignition controlling process corresponding to the switching operation from the partial cylinder unworking mode to the all cylinder working mode shown in the step s7. The process shown in FIG. 20 is used as the foregoing torque controlling process corresponding to the switching operation from the all cylinder working mode to the partial cylinder unworking mode shown in the step s8. The explanations of these processes are omitted herein.

In the case that an engine is provided with the controlling apparatus performing the processes for controlling the switching operation of the running mode, for controlling the ignition timing at the time when the partial cylinder unworking mode is switched to the all cylinder working mode, and for controlling the torque at the time when the all cylinder working mode is switched to the partial cylinder unworking mode as shown in FIGS. 21, 19 and 20, respectively, the following advantages can be obtained. When the partial cylinder unworking mode is switched to the all cylinder working mode, the sudden variation of the output torque of the engine at a transition period of the running mode is restrained by the retard of the ignition timing. At the same time, the retard amount is corrected on the basis of the running condition of the engine. Consequently, the engine is retained in a desirable running condition corresponding to an actual state. If the all cylinder working mode is switched to the partial cylinder unworking mode, the idle-up process results in restraining the engine torque from decreasing, thereby making it possible to rapidly return the engine torque to an appropriate level.

POSSIBILITY OF USE IN INDUSTRY

As will have been understood from the foregoing description, an automotive vehicle engine according to the present invention is effective for the engine comprising an OHC-type valve motion system, and particularly is extremely effective for the automotive vehicle engine operated in a wide running condition apt to be varied at all times.

What is claimed is:

1. An automotive vehicle engine provided with a cylinder suspending mechanism for suspending the working of a partial number of cylinders in response to running conditions of the engine, comprising:

a revolution sensor for detecting a revolution speed of said engine;

a boost pressure sensor for producing data of a boost pressure of said engine;

an ignition driving apparatus for causing said engine to run in such a manner that electric sparks are produced in said engine at respective target ignition timings; and a controlling apparatus for controlling said cylinder suspending mechanism and said ignition driving apparatus, wherein said controlling apparatus has a running mode map for determining an all cylinder working mode and a partial cylinder non-working mode on the basis of said revolution speed and said data of said boost pressure of said engine and an ignition retard map for determining a retard amount used during a calculation of said target ignition timings in such a manner that said retard amount decreases with a predetermined lapse of time, said controlling apparatus controlling said ignition driving apparatus in such a manner that electric sparks are produced in said engine at said respective target ignition timings calculated on the basis of said retard amount decreased with the lapse of time and a standard ignition timing when a stroke number counted after determination of a switching operation from said partial cylinder non-working mode to said all cylinder working mode is within a predetermined range.

2. The automotive vehicle engine as set forth in claim 1, in which said controlling apparatus further has a retard correction map for determining a retard correction amount on the basis of said data of said boost pressure, said retard correction amount being used for correcting said retard amount when said engine is held in predetermined retard correction conditions, and said controlling apparatus controlling said ignition driving apparatus in such a manner that electric sparks are produced in said engine at said respective target ignition timings calculated on the basis of said retard amount, said retard correction amount and said standard ignition timings when said stroke number counted after said determination of said switching operation from said partial cylinder non-working mode to said all cylinder working mode is within said predetermined range.

3. The automotive vehicle engine as set forth in claim 2, in which said predetermined retard correction conditions corresponds to an idle running condition and an acceleration condition, said controlling apparatus correcting said retard amount in such a manner that said retard amount decreases when said engine is held in said predetermined retard correction conditions.

4. An automotive vehicle engine provided with a cylinder suspending mechanism for suspending the working of a partial number of cylinders in response to running conditions of said engine, comprising:

a revolution sensor for detecting a revolution speed of said engine;

a boost pressure sensor for producing data of a boost pressure of said engine;

an ignition driving apparatus for causing said engine to run in such a manner that electric sparks are produced in said engine at respective target ignition timings;

an idle speed controlling apparatus for controlling an idle revolution speed of said engine in such a manner that said idle revolution speeds converge to a target idle speed value and a controlling apparatus for controlling said cylinder suspending mechanism, said idle speed controlling apparatus and said ignition driving apparatus, wherein said controlling apparatus has a running mode map for determining an all cylinder working mode and a partial cylinder non-working mode on the basis of said revolution speed and said data of said boost pressure of said engine, and a torque correction map for shifting said target idle speed value from a low idle speed value to a high idle speed value and for determining a retard amount used during a calculation of said target ignition timings in such a manner that said retard amount increases with a predetermined lapse of time, said controlling apparatus controlling said idle speed controlling apparatus in such a manner that said idle revolution speeds converge to said target idle speed value shifted to said high idle speed value, and controlling said ignition driving apparatus in such a manner that electric sparks are produced in said engine at said respective target ignition timings calculated on the basis of said retard amount increased with the lapse of time and a standard ignition timing when the stroke number counted after determination of the switching operation from said all cylinder working mode to said partial cylinder non-working mode is within a predetermined range.

5. The automotive vehicle engine as set forth in claim 4, in which said controlling apparatus controls said ignition driving apparatus under the condition that said retard amount starts to increase with a predetermined delay time after said target idle speed value is shifted to said high idle speed value by said idle speed controlling apparatus.

6. An automotive vehicle engine provided with a cylinder suspending mechanism for suspending the working of a partial number of cylinders in response to running conditions of said engine, comprising:

a revolution sensor for detecting a revolution speed of said engine;

a boost pressure sensor for producing data of a boost pressure of said engine;

an ignition driving apparatus for causing said engine to run in such a manner that electric sparks are produced in said engine at respective target ignition timings;

an idle speed controlling apparatus for controlling the idle revolution speed of said engine in such a manner that said idle revolution speeds converge to a target idle speed value; and a controlling apparatus for controlling said cylinder suspending mechanism, said idle speed controlling apparatus and said ignition driving apparatus, wherein said controlling apparatus has a running mode map for determining an all cylinder working mode and a partial cylinder non-working mode on the basis of said revolution speed and said data of said boost pressure of said engine, a torque correction map for shifting said target idle speed value from a low idle speed value to a high idle speed value and for determining a retard amount used during a calculation of said target ignition timings in such a manner that said retard amount increases with a lapse of time, and an ignition retard map for determining said retard amount used during a calculation of said target ignition timings in such a manner that said retard amount decreases with the lapse of time, said controlling apparatus controlling said ignition driving apparatus in such a manner that electric sparks are produced in said engine at said respective target ignition timings calculated on the basis of said retard amount decreased with the lapse of time and said standard ignition timings when a stroke number counted after determination of a switching operation from said partial cylinder non-working mode to said all cylinder working mode is within a predetermined range, and said controlling apparatus controlling said idle speed controlling apparatus in such a manner that said idle revolution speeds converge to said target idle speed value shifted to said high idle speed value and controlling said ignition driving apparatus in such a manner that electric sparks are produced in said engine at said target ignition timings calculated on the basis of said retard amount increased with the lapse of time and said standard ignition timing when a stroke number counted after determination of the switching operation from said all cylinder working mode to said partial cylinder non-working mode is within a predetermined range.

7. The automotive vehicle engine as set forth in claim 6, in which said controlling apparatus further has a retard correction map for determining the retard correction amount on the basis of said data of said boost pressure, said retard correction amount being used for a correction of said retard amount decreased as time goes by when said engine is held in predetermined retard correction conditions, and said controlling apparatus controlling said ignition driving apparatus in such a manner that the electric sparks are produced in said engine at said respective target ignition timings calculated on the basis of said retard amount decreased with the lapse of time, said retard correction amount and said standard ignition timings when said stroke number counted after said determination of said switching operation from said partial cylinder unworking mode to said all cylinder working mode is within said predetermined range.

8. The automotive vehicle engine as set forth in claim 7, in which said predetermined retard correction conditions corresponds to an indie running condition and an acceleration condition, said controlling apparatus correcting said retard amount decreased with the lapse of time in such a manner that said retard amount decreases when said engine is held in said predetermined retard correction conditions.

* * * * *